(12) United States Patent
Tremblay et al.

(10) Patent No.: US 11,747,231 B2
(45) Date of Patent: Sep. 5, 2023

(54) HEAT-LOSS PRESSURE MICROSENSORS

(71) Applicant: INSTITUT NATIONAL D'OPTIQUE, Québec (CA)

(72) Inventors: Bruno Tremblay, Québec (CA); Alex Paquet, Québec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 0 days.

(21) Appl. No.: 17/905,813

(22) PCT Filed: Apr. 8, 2020

(86) PCT No.: PCT/CA2020/050460
§ 371 (c)(1),
(2) Date: Sep. 7, 2022

(87) PCT Pub. No.: WO2021/203187
PCT Pub. Date: Oct. 14, 2021

(65) Prior Publication Data
US 2023/0131448 A1    Apr. 27, 2023

(51) Int. Cl.
*G01L 11/00* (2006.01)
*G01L 27/00* (2006.01)
*G01K 7/22* (2006.01)

(52) U.S. Cl.
CPC .......... *G01L 11/002* (2013.01); *G01L 27/002* (2013.01); *G01K 7/22* (2013.01)

(58) Field of Classification Search
CPC ........ G01L 11/002; G01L 27/002; G01K 7/22
(Continued)

(56) References Cited

U.S. PATENT DOCUMENTS 6,945,119 B2 * 9/2005 Bills ...................... G01L 21/12
                                                                73/19.05
7,331,237 B2 * 2/2008 Borenstein .............. G01L 21/12
                                                                73/708
(Continued)

OTHER PUBLICATIONS

International Search Report and Written Opinion as issued in connection with International Patent Application No. PCT/CA2020/050460, dated Dec. 4, 2020.
(Continued)

*Primary Examiner* — Nathaniel T Woodward
(74) *Attorney, Agent, or Firm* — MASCHOFF BRENNAN

(57) ABSTRACT

A heat-loss pressure microsensor for measuring a gas pressure is disclosed that includes a plurality of pressure gauges arranged proximate to one another on a substrate. The gauges may include a pair of gauges, each gauge including a thermistor having an electrical resistance that varies with its temperature, the thermistor's temperature being responsive to the gas pressure, a platform to receive the thermistor, and a support structure to hold the platform above the substrate. Each gauge may be configured to produce a gauge output signal related to the electrical resistance of its thermistor. The two gauges are configured with their platforms having equal nominal perimeters and different nominal surface areas, and their support structures having the same nominal geometry. A differential signal may be obtained from the two gauge output signals. The differential signal conveys information about the gas pressure and exhibits reduced sensitivity to fabrication-related dimensional variations.

20 Claims, 13 Drawing Sheets

(58) Field of Classification Search
USPC .......................................................... 73/755
See application file for complete search history.

(56) References Cited

U.S. PATENT DOCUMENTS

| | | | |
|---|---|---|---|
| 8,117,898 | B2 | 2/2012 | Viens et al. |
| 8,171,801 | B2* | 5/2012 | Le Noc .................. G01L 21/12 |
| | | | 73/754 |
| 8,748,808 | B2 | 6/2014 | Le Noc et al. |
| 9,022,644 | B1* | 5/2015 | Arft ......................... H03L 1/00 |
| | | | 374/208 |
| 9,335,231 | B2 | 5/2016 | Gu et al. |
| 9,360,357 | B2* | 6/2016 | Huang ................. G01F 1/6845 |
| 2003/0010129 | A1* | 1/2003 | Gu .......................... G01L 21/12 |
| | | | 73/716 |
| 2010/0154510 | A1* | 6/2010 | Viens ..................... G01N 27/18 |
| | | | 73/25.03 |
| 2010/0154554 | A1* | 6/2010 | Le Noc .................. G01L 21/12 |
| | | | 73/755 |
| 2013/0233086 | A1 | 9/2013 | Besling et al. |

OTHER PUBLICATIONS

Junseok Chae, Brian H. Stark, Khalil Najafia, "Micromachined Pirani Gauge With Dual Heat Sinks", IEEE Transactions on Advanced Packaging, Nov. 2005, pp. 619-625, vol. 28, No. 4, United States.
Sisto et al., "Pressure sensing in vacuum hermetic micropackaging for MOEMS-MEMS", Proceedings of SPIE, Feb. 2010, vol. 7592, United States.
Sisto et al., "Pressure sensing in vacuum hermetic micropagacking for MOEMS-MEMS" J Micro-Nanolith, Oct.-Dec. 2010, vol. 9(4), Canada.

* cited by examiner

HEAT-LOSS PRESSURE MICROSENSORS

RELATED PATENT APPLICATION

The present application is a national stage application under 35 U.S.C. § 371 of International Application No. PCT/CA2020/050460, filed Apr. 8, 2020, the disclosure of which is incorporated herein by reference in its entirety".

TECHNICAL FIELD

The technical field generally relates to pressure microsensors and, more particularly, to heat-loss pressure microsensors providing reduced sensitivity to fabrication-related dimensional variations.

BACKGROUND

Pressure microsensors are used in a wide range of vacuum technology applications, including the packaging and processing industries. In particular, vacuum packaging is an important and expensive step in the manufacturing of microelectromechanical systems (MEMS) and microoptoelectromechanical systems (MOEMS). Micro-Pirani pressure sensors are one type of pressure microsensors. A micro-Pirani sensor generally includes a thermistor disposed on a suspended platform and exposed to a gas whose pressure is to be measured. When an electrical signal is applied to the thermistor, the temperature of the thermistor increases until it reaches an equilibrium value, resulting in a change of electrical resistance in accordance with the thermistor's temperature coefficient of resistance (TCR). The thermistor's equilibrium temperature is a function of the heat transferred with its surroundings, which effectively depends on the gas pressure. Thus, measurement of the electrical resistance of the thermistor can provide a direct indication of the pressure. Micro-Pirani sensors are used for pressure measurement and monitoring in a variety of applications and systems, and can be made using typical microfabrication techniques, such as bulk and surface micromachining, which can include multi-step processes involving photolithography, etching, deposition, and annealing. These techniques are associated with unavoidable fabrication-related dimensional variations that can impose challenges or limitations on the performance of micro-Pirani sensors.

SUMMARY

The present description generally relates to techniques for mitigating or controlling the impact of fabrication-related dimensional variations in microfabricated heat-loss pressure sensors, such as those based on micro-Pirani gauges.

In accordance with an aspect, there is provided a heat-loss pressure microsensor for measuring a gas pressure in an environment. The heat-loss pressure microsensor includes a substrate, a first pressure gauge, and a second pressure gauge. The first pressure gauge is arranged on the substrate and includes: a first thermistor having an electrical resistance that varies in accordance with a temperature of the first thermistor, the temperature of the first thermistor being responsive to the gas pressure in the environment; a first platform configured to receive the first thermistor; and a first support structure configured to hold the first platform above the substrate, wherein the first pressure gauge is configured to produce a first gauge output signal related to the electrical resistance of the first thermistor. The second pressure gauge is arranged on the substrate proximate to the first pressure gauge. The second pressure gauge includes: a second thermistor having an electrical resistance that varies in accordance with a temperature of the second thermistor, the temperature of the second thermistor being responsive to the gas pressure in the environment; a second platform configured to receive the second thermistor; and a second support structure configured to hold the second platform above the substrate, wherein the second pressure gauge is configured to produce a second gauge output signal related to the electrical resistance of the second thermistor. The first platform and the second platform are configured to have equal nominal perimeters and different nominal surface areas. The first support structure and second support structure are configured to have a same nominal geometry. A differential signal obtained from the first and second gauge output signals conveys information about the gas pressure in the environment.

In one embodiment, the first and second pressure gauges are spaced apart from each other by a center-to-center inter-gauge distance ranging from about 40 μm to about 500 μm.

In one embodiment, the first and second platforms each have a square shape, a rectangular shape, a polygonal shape, a circular shape, or an elliptical shape. In one embodiment, one of the first and second platforms has a square shape and the other one of the first and second platforms has a rectangular shape.

In one embodiment, the first and second support structures each include a plurality of support arms connected to the first platform and the second platform, respectively.

In one embodiment, the first and second thermistors are each made of a vanadium oxide material, an amorphous silicon material, or a titanium oxide material.

In one embodiment, the first gauge output signal is representative of a first amount of electrical power for varying the electrical resistance of the first thermistor between two resistance values corresponding to a change in the temperature of the first thermistor between a first pair of temperature values, and the second gauge output signal is representative of a second amount of electrical power needed for varying the electrical resistance of the second thermistor between two resistance values corresponding to a change in the temperature of the second thermistor between a second pair of temperature values. In one embodiment, the temperature values of the first pair are substantially the same as the temperature values of the second pair.

In one embodiment, the heat-loss pressure microsensor further includes: an electrical readout circuit electrically connected to the first thermistor and the second thermistor and configured to measure the first gauge output signal and the second gauge output signal; and a processing unit operatively connected to the electrical readout circuit and configured to receive the first gauge output signal and the second gauge output signal measured by the electrical readout unit, obtain the differential signal from the first and second gauge output signals, and determine the gas pressure in the environment from the differential signal. In one embodiment, the processing unit is configured to determine the differential signal by calculating a difference between a first thermal conductance, associated with the first pressure gauge and derived from the first gauge output signal, and a second thermal conductance, associated with the second pressure gauge and derived from the second gauge output signal. In one embodiment, the processing unit is configured to determine the gas pressure in the environment from the differential signal by comparing the differential signal with calibration data relating a differential thermal conductance parameter of the heat-loss pressure microsensor to gas pressure.

In one embodiment, the heat-loss pressure microsensor further includes a third pressure gauge and a fourth pressure gauge. The third pressure gauge is arranged on the substrate proximate to the first pressure gauge and the second pressure gauge. The third pressure gauge includes: a third thermistor having an electrical resistance that varies in accordance with a temperature of the third thermistor, the temperature of the third thermistor being responsive to the gas pressure in the environment; a third platform configured to receive the third thermistor; and a third support structure configured to hold the third platform above the substrate, wherein the third pressure gauge is configured to produce a third gauge output signal related to the electrical resistance of the third thermistor, and wherein the third pressure gauge being configured to be substantially identical to the first pressure gauge. The fourth pressure gauge is arranged on the substrate proximate to the first pressure gauge, the second pressure gauge, and the third pressure gauge. The fourth pressure gauge includes: a fourth thermistor having an electrical resistance that varies in accordance with a temperature of the fourth thermistor, the temperature of the fourth thermistor being responsive to the gas pressure in the environment; a fourth platform configured to receive the fourth thermistor; and a fourth support structure configured to hold the fourth platform above the substrate, wherein the fourth pressure gauge is configured to produce a fourth gauge output signal related to the electrical resistance of the fourth thermistor, and wherein the fourth pressure gauge being configured to be substantially identical to the second pressure gauge. The first, second, third, and fourth gauge output signals are associated with respective first, second, third, and fourth temperature values of the first, second, third, and fourth thermistors, the first and third temperature values being different from each other, and the second and fourth temperature values being different from each other. The differential signal is obtained from a first combined output signal obtained from the first and third gauge output signals and from a second combined output signal obtained from the second and fourth gauge output signals. In one embodiment, the first and second temperature values are substantially the same and the third and fourth temperature values are substantially the same.

In one embodiment, the third and fourth pressure gauges are spaced apart from each other and from the first and second pressure gauges by inter-gauge distances ranging from 40 µm to 500 µm.

In one embodiment, the heat-loss pressure microsensor further includes: an electrical readout circuit electrically connected to the first, second, third, and fourth thermistors, the electrical readout circuit being configured to measure the first, second, third, and fourth gauge output signals; and a processing unit operatively connected to the electrical readout circuit and configured to receive the first, second, third, and fourth gauge output signals measured by the electrical readout unit, obtain the differential signal from the first, second, third, and fourth gauge output signals, and determine the gas pressure in the environment from the differential signal.

In accordance with another aspect, there is provided a method for measuring a gas pressure in an environment. The method includes providing a first pressure gauge and a second pressure gauge in a proximate relationship on a substrate, each one of the first and second pressure gauges including a thermistor having an electrical resistance that varies in accordance with a temperature of the thermistor, the temperature of the thermistor being responsive to the gas pressure in the environment, a platform configured to receive the thermistor, and a support structure configured to hold the platform above the substrate, wherein the two platforms are configured to have equal nominal perimeters and different nominal surface areas, and the two support structures are configured to have a same nominal geometry. The method also includes measuring a first gauge output signal and a second gauge output signal indicative of the electrical resistance of the thermistor of the first and second pressure gauges, respectively. The method further includes obtaining a differential signal from the measured first and second gauge output signals, and determining the gas pressure in the environment from the differential signal.

In one embodiment, obtaining the differential signal includes: deriving, from the first gauge output signal, a first thermal conductance associated with the first pressure gauge; deriving, from the second gauge output signal, a second thermal conductance associated with the second pressure gauge; and calculating the differential signal as a difference between the first thermal conductance and the second thermal conductance.

In one embodiment, providing the first pressure gauge and the second pressure gauge includes arranging the first pressure gauge and the second pressure gauge spaced apart from each other by a center-to-center inter-gauge distance ranging from about 40 µm to about 500 µm.

In one embodiment, measuring the first gauge output signal includes relating the first gauge output signal to an amount of electrical power for varying the electrical resistance of the thermistor of the first pressure gauge between two resistance values corresponding to a change in a temperature of the thermistor of the first pressure gauge between a first pair of temperature values, and measuring the second gauge output signal includes relating the second gauge output signal to an amount of electrical power for varying the electrical resistance of the thermistor of the second pressure gauge between two resistance values corresponding to a change in a temperature of the thermistor of the second pressure gauge between a second pair of temperature values.

In one embodiment, the method further includes providing a third pressure gauge and a fourth pressure gauge on the substrate in a proximate relationship with each other and with the first and second pressure gauges, each one of the third and fourth pressure gauges including a thermistor having an electrical resistance that varies in accordance with a temperature of the thermistor, the temperature of the thermistor being responsive to the gas pressure in the environment, a platform configured to receive the thermistor, and a support structure configured to hold the platform above the substrate, wherein the third and fourth pressure gauges are configured to be substantially identical to the first and second pressure gauges, respectively. The method also includes measuring a third gauge output signal and a fourth gauge output signal indicative of the electrical resistance of the thermistor of the third and fourth pressure gauges, respectively. The first, second, third, and fourth gauge output signals are associated with respective first, second, third, and fourth temperature values of the first, second, third, and fourth thermistors, the first and third temperature values being different from each other, and the second and fourth temperature values being different from each other, and obtaining the differential signal includes obtaining a first combined output signal from the measured first and third gauge output signals, obtaining a second combined output signal from the measured second and fourth gauge output signals, and determining the differential signal from the first and second combined output signals.

It is to be noted that other method and process steps may be performed prior to, during or after the method and process steps described herein. The order of one or more of the steps may also differ, and some of the steps may be omitted, repeated, and/or combined, depending on the application.

Other features and advantages of the present description will become more apparent upon reading of the following non-restrictive description of specific embodiments thereof, given by way of example only with reference to the appended drawings. Although specific features described in the above summary and the foregoing detailed description may be described with respect to specific embodiments or aspects, it should be noted that these specific features can be combined with one another unless stated otherwise.

BRIEF DESCRIPTION OF THE DRAWINGS

FIG. 3A also depicts a mean calibration curve (solid line) obtained from the set of individual calibration curves.

FIG. 11A: square and circular; FIG. 11B: circular and rectangular; FIG. 11C: hexagonal and rectangular; FIG. 11D: elliptical and circular; and FIG. 11E: square and square with a square hole therein.

DETAILED DESCRIPTION

Figure 1:
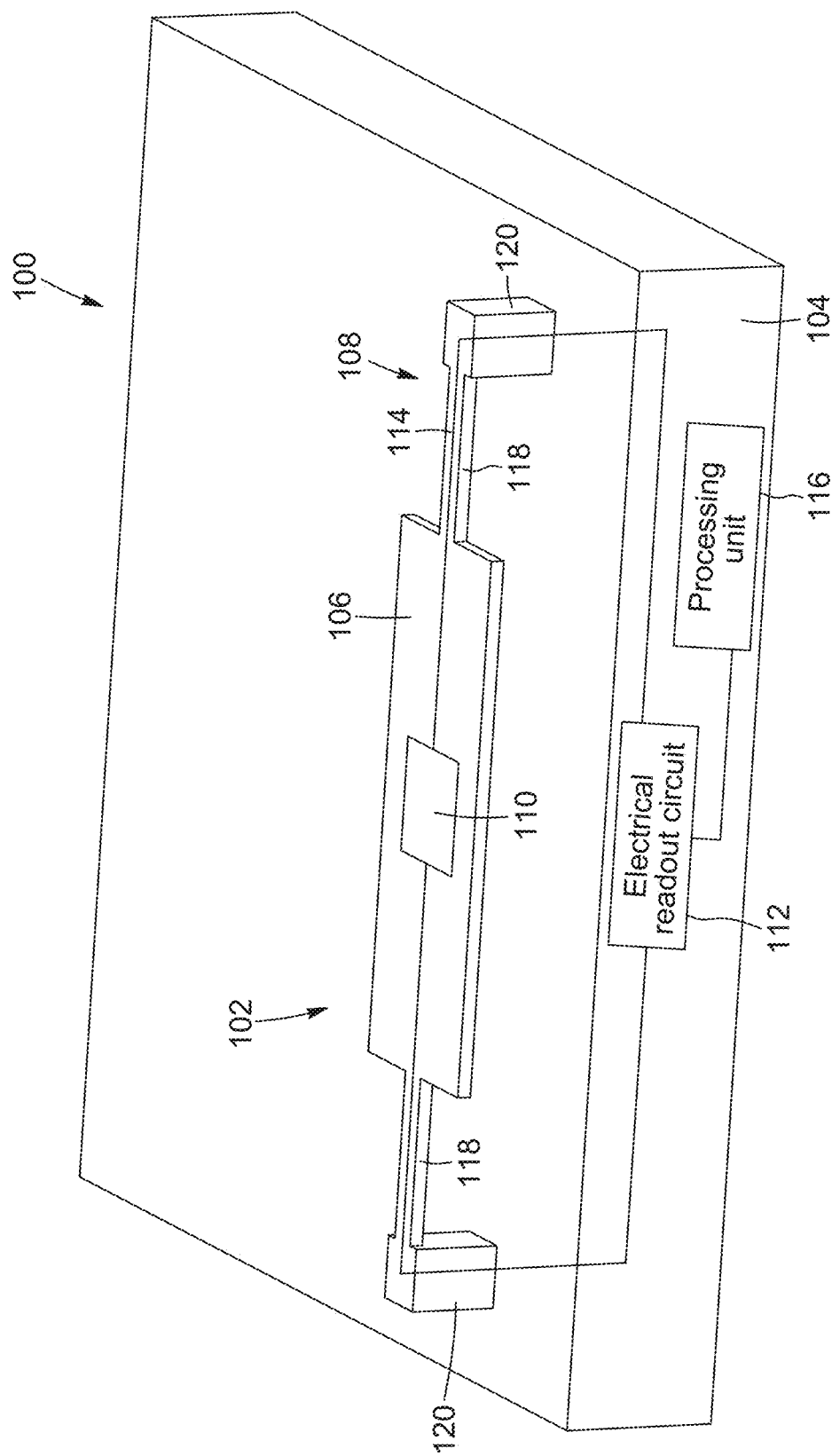
FIG. 1 is a schematic representation of an example of a micro-Pirani gauge, which may be used in embodiments of the pressure microsensors disclosed herein.

In the present description, similar features in the drawings have been given similar reference numerals. To avoid cluttering certain figures, some elements may not be indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. As can be appreciated, such spatially relative terms are intended to encompass different orientations in the use or operation of the present embodiments, in addition to the orientations exemplified in the figures.

In the present description, when a first element is referred to as being "on", "above", "below", "over", or "under" a second element, the first element can be either directly or indirectly on, above, below, over, or under the second element, respectively, such that one or multiple intervening elements may be disposed between the first element and the second element.

Unless stated otherwise, the terms "connected" and "coupled", and derivatives and variants thereof, are intended to refer to any connection or coupling, either direct or indirect, between two or more elements. For example, the connection or coupling between the elements may be mechanical, optical, electrical, magnetic, thermal, chemical, logical, fluidic, operational, or any combination thereof.

In the present description, the terms "a", "an", and "one" are defined to mean "at least one", that is, these terms do not exclude a plural number of elements, unless stated otherwise.

Terms such as "substantially", "generally", and "about", that modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10 percent of the stated value. It is noted that all numeric values used herein are assumed to be modified by the term "about", unless stated otherwise.

The present description generally relates to techniques for compensating or at least reducing the effect of fabrication-related dimensional variations in heat-loss pressure microsensors.

As described in greater detail below, a heat-loss pressure microsensor in accordance with an embodiment may include a substrate and a plurality of pressure gauges arranged on the substrate and exposed to the gas whose pressure is to be measured. The pressure gauges may be located sufficiently close to one another on the substrate for them to be characterized by fabrication-related dimensional variations that, although a priori unknown, can be assumed to be substantially the same. The pressure gauges may include a first pressure gauge and a second pressure gauge. Each pressure gauge includes a thermistor having an electrical resistance that varies in accordance with its temperature, which itself is responsive to the gas pressure to be measured; a platform configured to receive the thermistor; and a support structure configured to suspend the platform above the substrate. Each pressure gauge may be configured to generate a respective gauge output signal that is representative of or related to the pressure-dependent electrical resistance of its thermistor. The first and second pressure gauges may have different geometries, leading to different first and second gauge output signals. By enforcing certain geometrical design rules, a differential signal may be obtained from the first and second gauge output signals, from which the gas pressure may be determined. The differential signal may be less sensitive to fabrication-related dimensional variations than either of the first and second gauge output signals. The geometrical design rules may include providing the first and second pressure gauges with support structures configured to have the same nominal geometry and with platforms configured to have equal nominal perimeters but different nominal surface areas.

The present techniques make it possible to collectively calibrate all or a subset of nominally identical two-gauge pressure microsensors fabricated on a same wafer by determining a calibration curve for only one of the pressure microsensors, despite the fact that pressure microsensors located far from one another on the wafer may suffer from different fabrication-related dimensional variations. This single calibration curve may then be used with acceptable accuracy with all of the pressure microsensors fabricated on the wafer or on a region thereof, even though the pressure microsensors may be used in different applications after the dicing of the wafer into individual dies. The use of such a single calibration curve may be advantageous in that it obviates the need to individually calibrate every pressure microsensor fabricated on a wafer, since performing such individual calibration runs may be costly, inefficient, or difficult to implement, as more than thousands of gauges may be fabricated on a single wafer.

The present techniques may be useful in a variety of fields and industries that may benefit from or require pressure microsensors with reduced sensitivity to fabrication-related dimensional variations. In particular, the present techniques may be used in systems and processes for pressure measurement and hermeticity monitoring over various pressure ranges, for example ranging from about $10^3$ Torr down to about $10^{-5}$ Torr. Non-limiting examples of applications include in situ pressure measurements in die-level and wafer-level vacuum-packaged MEMS and MOEMS devices (e.g., bolometers, resonators, accelerometers, and gyroscopes) and use in analytical and processing equipment with integrated vacuum systems (e.g., mass spectrometers, scanning electron microscopes, thin-film deposition facilities, and vacuum-assisted resin transfer molding systems).

Various aspects and implementations of the present techniques are described below with reference to the figures.

Referring to FIG. 1, there is illustrated a schematic perspective view of an example of a micro-Pirani pressure gauge 100 for measuring gas pressure in an environment 102. The pressure gauge 100 of FIG. 1 may be used as one of the gauges in embodiments of heat-loss pressure microsensors disclosed herein. The pressure gauge 100 is provided on a substrate 104 and includes a suspended platform 106, a support structure 108 holding the platform 106 above the substrate 104, a thermistor 110 received on the platform 106, an electrical readout circuit 112 located in the substrate 104, and an electrode structure 114 electrically connecting the thermistor 110 to the electrical readout circuit 112. The structure, composition, and operation of these and other possible components of the pressure gauge 100 are described in greater detail below.

Micro-Pirani pressure gauges such as the one depicted in FIG. 1 can be fabricated using common integrated-circuit and MEMS/MOEMS wafer processing techniques, such as surface and bulk micromachining. In such techniques, the gauge components can be successively deposited and patterned on a substrate using thin-film deposition techniques paired with selective photoresist and sacrificial layer etching processes. In some applications, micro-Pirani gauges can be fabricated using a monolithic integration approach in which the substrate, typically provided with an underlying readout integrated circuit (ROIC), is pre-manufactured using complementary metal-oxide-semiconductor (CMOS) processes. However, it is appreciated that the pressure gauges described herein can be fabricated using other manufacturing techniques.

The substrate 104 provides mechanical support for the pressure gauge 100. The substrate 104 may be made of silicon (Si), silicon carbide (SiC), gallium arsenide (GaAs), germanium (Ge), or another suitable material or combination of materials. The electrical readout circuit 112 may be embodied by a number of CMOS circuitry layers formed on or in the substrate 104. Alternatively, the electrical readout circuit 112 may be provided outside of the substrate 104. The electrical readout circuit 112, which may be active or passive, is configured to measure changes in the electrical resistance of the thermistor 110 resulting from heat transfer to its surroundings, namely the substrate 104 and the environment 102, and to provide an electrical output signal (e.g., a voltage and/or a current) representative of the measured changes in electrical resistance. The pressure gauge 100 may include an electrode structure 114 configured to connect electrically the thermistor 110 to the electrical readout circuit 112. The pressure gauge 100 may further include a processing unit 116 configured to process the electrical output signal from the electrical readout circuit 112 in order to determine, with proper calibration, the gas pressure in the environment 102.

The platform 106 is suspended above the substrate 104 by the support structure 108. The term "platform" generally refers herein to a substantially planar suspended structure, typically having greater horizontal dimensions than vertical thickness. In the present description, the term "horizontal" refers to directions lying in a plane generally parallel to the substrate 104, while the term "vertical" refers to a direction generally perpendicular to the plane of the substrate 104.

The suspension of the platform 106 above the substrate 104 provides thermal isolation to the thermistor 110, in order to enhance the detection sensitivity of the pressure gauge 100. The platform 106 may be a single or multilayer structure made of an electrically insulating, mechanically self-supportive, and low-stress material, such as silicon nitride and silicon dioxide. The platform 106 may have lateral dimensions ranging from about 10 μm to about 100 μm, and a thickness ranging from about 0.1 μm to about 1 μm, although other dimensions may be used in other implementations. It is appreciated that the platform 106 may be provided in a variety of shapes, dimensions, and configurations.

In the present description, the term "support structure" is used to refer broadly to a structure configured to suspend the platform 106 in a spaced-apart relationship above the substrate 104. For example, the support structure 108 is configured to hold the platform 106 at a height ranging from about 0.5 μm to about 10 μm above the substrate 104, although other height values are possible in other implementations. The support structure 108 also provides a path for the electrode structure 114 to connect the thermistor 110 to the electrical readout circuit 112. Like the platform 106, the support structure 108 may be made of a low-stress and self-supporting material such as silicon nitride or silicon dioxide. In some embodiments, it may be convenient to describe the support structure 108 as having arms 118 and posts 120. The terms "arm" and "post" generally refer herein to structural elements of the support structure 108 that extend mainly horizontally and mainly vertically, respectively. In FIG. 1, the support structure 108 includes two arms 118 that extend outwardly from opposite edges of the platform 106, and two posts 120 connecting the two arms 118 to the substrate 104. It is appreciated, however, that the support structure 108 may have a variety of configurations to meet the mechanical, electrical, and/or thermal requirements or preferences of a given application. For example, the arms 118 and posts 120 of the support structure 108 may have various shapes and dimensions, and their number can vary depending on the application. In particular, the arms 118 and posts 120 need not be straight, but may have a variety of irregular or more complex configurations to provide more control over the thermal conductance of the support structure 108. Furthermore, while the arms 118 extend from opposite edges of the platform 106 in FIG. 1, other configurations are possible, such as arms extending from the same edge of the platform or from a region closer to the center of the platform rather than near its outer periphery.

Referring still to FIG. 1, the pressure gauge 100 includes a thermistor 110 disposed on or in the platform 106. In the present description, the term "thermistor" is intended to encompass any suitable material, structure, or device having an electrical resistance that changes as a function of its temperature, generally in a predictable and controllable manner. The thermistor 110 may be made of a material having a high TCR at room temperature, for example at least 0.5% per kelvin in absolute value. Non-limiting examples of thermistor materials include vanadium oxide, amorphous silicon, and titanium oxide. However, other thermistor materials or combination of thermistor materials may be used in other implementations including, but not limited to, semiconductor-, ceramic-, polymer-, and metal-based thermistors, with either positive or negative TCR. The pressure gauge 100 of FIG. 1 includes a single thermistor 110, which is depicted as a rectangular thin film whose width, length, and thickness can be selected in order to control its thermal and electrical properties. It is appreciated, however, that the size, shape, and arrangement of the thermistor 110 may be varied depending on the application, and that some embodiments may include more than one thermistor 110 on the platform 106.

The electrode structure 114 extends along the platform 106, the arms 118, the posts 120, and the substrate 104 to provide an electrically conductive path between the thermistor 110 and the electrical readout circuit 112. The electrode structure 114 may be formed using common microfabrication techniques, and have any suitable shape, size, composition, and configuration. In some implementations, the electrode structure 114 may essentially define the arms 118 of the support structure 108, that is, the arms 118 may not include additional self-supporting material beyond the material forming the electrode structure 114. As such, the electrode structure 114 forms part of the support structure 108.

The principles of operation of micro-Pirani gauges are known in the art [see, e.g., U.S. Pat. No. 8,171,801 and Sisto et al., "Pressure sensing in vacuum hermetic micropackaging for MOEMS-MEMS," Proc. SPIE vol. 7592, pp. 759204-1-759204-10 (2010), the contents of these two references being incorporated herein by reference in their entirety]. When an electrical current is applied to a micro-Pirani gauge 100, such as the one depicted in FIG. 1, and flows through the thermistor 110, the temperature of the thermistor 110 rises by Joule heating, resulting in a corresponding change of its electrical resistance. As its temperature increases, the thermistor 110 will transfer heat to its surroundings until it reaches an equilibrium temperature, which is characteristic of the gas pressure in the environment 102. At equilibrium, the thermodynamic interactions between the thermistor 110 and its surroundings can be expressed as follows:

$$P_{elec}+P_{rad,in}=P_{rad,out}+P_{cond,solid}+P_{cond,gas}+P_{conv,gas}, \quad (1)$$

where $P_{elec}$ is the heat absorbed by the thermistor 110 by Joule heating, caused by electrical current flowing through the thermistor 110; $P_{rad,in}$ is the heat absorbed by the thermistor 110 by radiative thermal exchanges with its surroundings; $P_{rad,out}$ is the heat radiated by the thermistor 110, which depends, inter alia, on its temperature, surface area, and emissivity; $P_{cond,solid}$ is the heat dissipated by conduction from the thermistor 110 to the substrate 104 through the support structure 108, which depends, inter alia, on the geometry and the thermal conductivity of the support structure 108; $P_{cond,gas}$ is the heat dissipated by conduction from the thermistor 110 to the environment 102 through the gas, which depends, inter alia, on the gas composition, temperature, and pressure, as well as the surface area of the platform 106 and the gap between the platform 106 and the substrate 104; and $P_{conv,gas}$ is the heat dissipated by convection from the thermistor to the environment 102 through the gas, which can generally be ignored compared to $P_{cond,gas}$, especially in the absence of forced gas convection in the environment 102 of the gauge 100.

Under the assumptions that $P_{rad,in}$ can be neglected compared to $P_{elec}$ and that $P_{conv,gas}$ can be neglected compared to $P_{cond,gas}$, which are generally satisfied in practice, Equation (1) can be written at steady state as follows:

$$P_{elec}=G_{total}(p)(T-T_0)=[G_{rad}+G_{solid}+G_{gas}(p)](T-T_0), \quad (2)$$

where T and $T_0$ are the thermistor's equilibrium and initial temperatures, respectively, and $G_{total}(p)=G_{rad}+G_{solid}+G_{gas}(p)$ is the total thermal conductance of the thermistor 110 with its surroundings, where $G_{rad}$ is the thermal conductance due to heat radiation from the thermistor 110 to its surroundings; $G_{solid}$ is the thermal conductance due to solid heat conduction from the thermistor 110 to the substrate 104 through the support structure 108; and $G_{gas}(p)$ is the thermal conductance due to heat conduction from the thermistor 110 to its surroundings through the gas, which depends on the gas pressure p in the environment 102.

Figure 2:
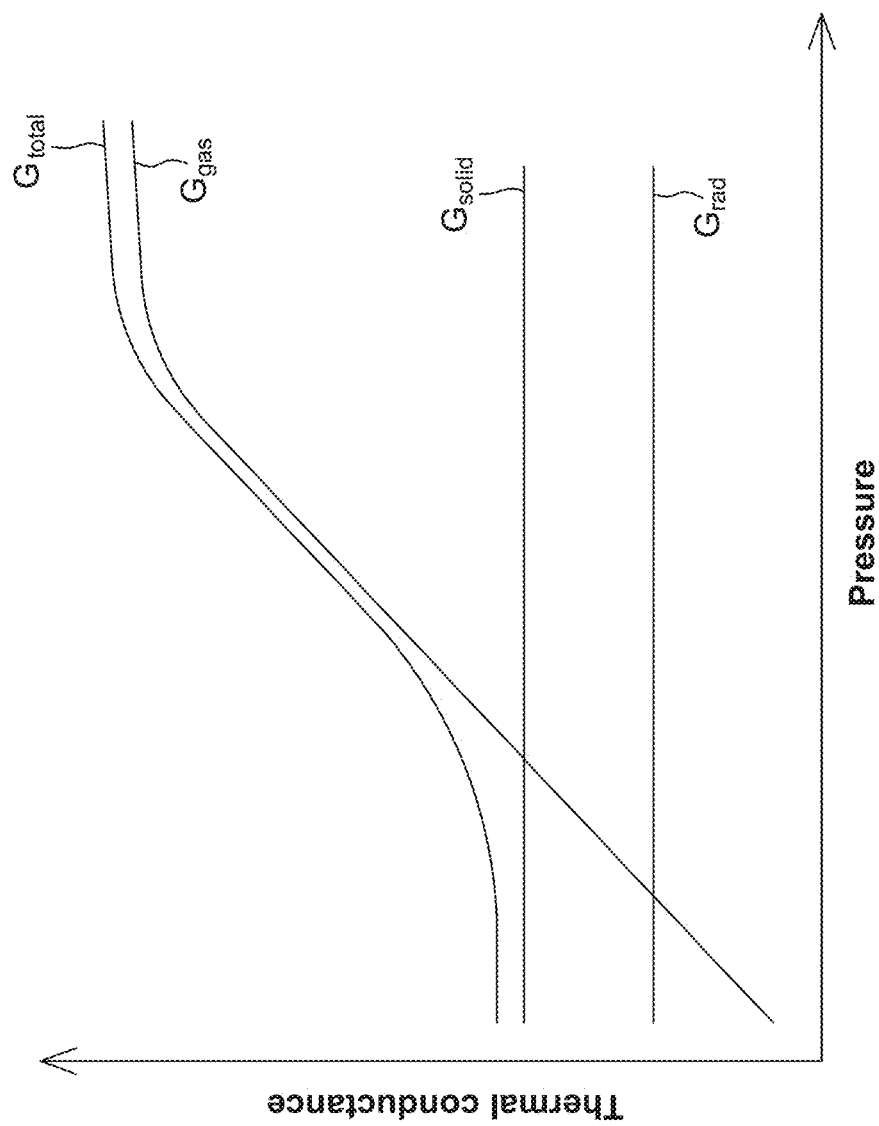
FIG. 2 is a graph depicting characteristic curves of the total thermal conductance $G_{total}$, the gas thermal conductance $G_{gas}$, the solid thermal conductance $G_{solid}$, and the radiative thermal conductance $G_{rad}$ of a typical micro-Pirani gauge in an environment, plotted as functions of the gas pressure in the environment. Both the abscissa and the ordinate of the graph of FIG. 2 are in logarithmic scales.

Referring to FIG. 2, there is shown a graph that depicts characteristic curves of $G_{total}$, $G_{gas}$, $G_{solid}$ and $G_{rad}$ plotted as functions of pressure for a typical micro-Pirani gauge such as the one illustrated in FIG. 1. It is appreciated that both the abscissa and the ordinate of the graph of FIG. 2 are in logarithmic scales. The behavior of the thermal conductance as a function of pressure shown in FIG. 2 is known in the art [see, e.g., Chae et al., "A Micromachined Pirani Gauge With Dual Heat Sinks," *IEEE Trans. Adv. Packag.*, 28 (4), pp. 619-625 (2005), the contents of which is incorporated herein by reference in its entirety]. The curve of the total thermal conductance $G_{total}$ has a characteristic S-shape. The gas thermal conductance $G_{gas}$ exceeds the radiative thermal conductance above a certain pressure, and increases generally linearly with pressure (on a log-log plot), up to a shoulder point at higher pressure where $G_{gas}$ starts to be less sensitive to pressure variations. The main operating range of the micro-Pirani gauge is the pressure range below the shoulder point, where $G_{gas}$ is directly proportional to the gas pressure. In this range, the sensitivity of the micro-Pirani gauge, which is defined by the slope of $G_{total}$ as a function of pressure, is determined mainly by $G_{gas}$, which is itself a function of the surface area of the platform containing the thermistor. The lower limit of the main operating range is dominated by $G_{solid}$. This limit, which is independent of pressure, depends mainly on the material properties and the geometrical dimensions of the support structure holding the platform.

Returning to FIG. 1, in operation, the thermal conductance $G_{total}$ of the pressure gauge 100 is derived from electrical measurements and used to determine the gas pressure p by comparison with calibration data. For example, a measurement of the variation of the thermistor's temperature with applied electrical power may be used to determine the thermal conductance, which in turn can be used to determine the gas pressure. In general, the thermistor's temperature, and therefore its electrical resistance, depends on all of the heat transfer mechanisms included in Eq. (1). In particular, the terms $P_{rad,in}$, $P_{rad,out}$, and $P_{cond,solid}$ may sometimes not be negligible compared to the power ($P_{cond,gas}+P_{conv,gas} \approx P_{cond,gas}$) dissipated through the gas. Furthermore, most of the heat transfer terms appearing in Eq. (1) are related to physical properties of the pressure gauge 100, which may not always be known precisely. A pressure measurement method that aims to eliminate or at least reduce the influence of the radiation and solid conduction contributions terms $P_{rad,in}$, $P_{rad,out}$, and $P_{cond,solid}$ and the need for precise knowledge of certain parameters is disclosed in co-assigned U.S. Pat. No. 8,171,801 [see also Sisto et al., "Pressure sensing in vacuum hermetic micropackaging for MOEMS-MEMS," *Proc. SPIE vol.* 7592, pp. 759204-1-759204-10 (2010)].

The method involves performing two measurements at two predetermined temperature values, $T_A$ and $T_B$, which respectively correspond to two thermistor's resistance values $R_A$ and $R_B$ by virtue of the thermistor's TCR. The first measurement includes applying a first electrical stimulation to the pressure gauge to determine a first amount of supplied electrical power $P_{elec,A}$ needed to bring the thermistor to the first temperature $T_A$ (or equivalently to the first resistance $R_A$). Similarly, the second measurement includes applying a second electrical stimulation to the pressure gauge to determine a second amount of supplied electrical power $P_{elec,B}$ needed to bring the thermistor to the second temperature $T_B$ (or equivalently to the second resistance $R_B$). The first and second amounts of electrical power $P_{elec,A}$ and $P_{elec,B}$ depend on the gas pressure to be measured. Then, assuming that the two measurements are carried out under substantially the same radiative environment, such that $\Delta P_{rad,in} \approx 0$, and that $\Delta P_{rad,out}$, $\Delta P_{cond,solid}$, and $\Delta P_{conv,gas}$ depends only on $T_A$ and $T_B$, Eq. (1) can be written as follows:

$$\Delta P_{elec} = \Delta P_{cond,gas} + \text{constant}, \quad (3)$$

where $\Delta P_{elec} = P_{elec,B} - P_{elec,A}$ and $\Delta P_{cond,gas} = P_{cond,gas,B} - P_{cond,A}$ (and likewise for the terms $\Delta P_{rad,in}$, $\Delta P_{rad,out}$, $\Delta P_{cond,solid}$, and $\Delta P_{conv,gas}$ introduced above and combined in the term "constant"). Eq. (3) indicates that a variation in $\Delta P_{elec}$ directly relates to a variation in $\Delta P_{cond,gas}$. At steady state, Eq. (3) can be written as follows:

$$\Delta P_{elec} = G_{total}(p)\Delta T, \quad (4)$$

where $G_{total}(p) = G_{rad} + G_{solid} + G_{gas}(p)$, as in Eq. (2), and $\Delta T = T_B - T_A$. Thus, it is possible to obtain the gas pressure p in the environment by determining $G_{total}(p)$ from the measured values of $P_{elec,A}$ and $P_{elec,B}$ to reach $T_A$ and $T_B$, and by referring to a calibration function of $G_{total}$ as a function of pressure. It is appreciated that Eq. (4) can be expressed in terms of the thermistor's resistances $R_A$ and $R_B$ by using the relationship $\Delta R \approx \alpha_{TCR}[(R_A+R_B)/2]\Delta T$, where $\Delta R = R_A - R_B$ and $\alpha_{TCR}$ is the thermistor's TCR.

It is appreciated that in order to yield reliable pressure measurements, a heat-loss pressure gauge should be properly calibrated. This may be accomplished, for example, by performing an initial calibration of the gauge, typically in a factory setting during its manufacturing process or prior to its first use, so as to provide proper conditions for accurate calibration. Typically, the initial calibration is carried out in a controlled pressure environment and involves comparing the response of the pressure gauge to be calibrated to those of standard reference gauges. Once calibrated, the pressure gauge is provided with an individual calibration response function, for example a calibration curve, lookup table, or other types of calibration data relating its total thermal conductance $G_{total}$ to gas pressure p, over a certain pressure range. This calibration response function may be stored in memory and retrieved during operation of the pressure gauge 100 in order to convert thermal conductance measurement data into pressure data.

It is also appreciated that, in principle, each pressure gauge fabricated on a wafer could be individually calibrated. However, in practice, performing such individual calibration runs may be costly, inefficient, or difficult to implement, as more than thousands of gauges may be fabricated on a single wafer. As a trade-off approach, a calibration method may involve calibrating only a limited number of gauges per wafer, typically between about 1% and about 30% of the gauges, in order to obtain a set of individual calibration curves. The method then involves combining the individual calibration curves to yield a mean or effective calibration curve, which is intended to be used by all of the gauges of the wafer.

Figure 3:
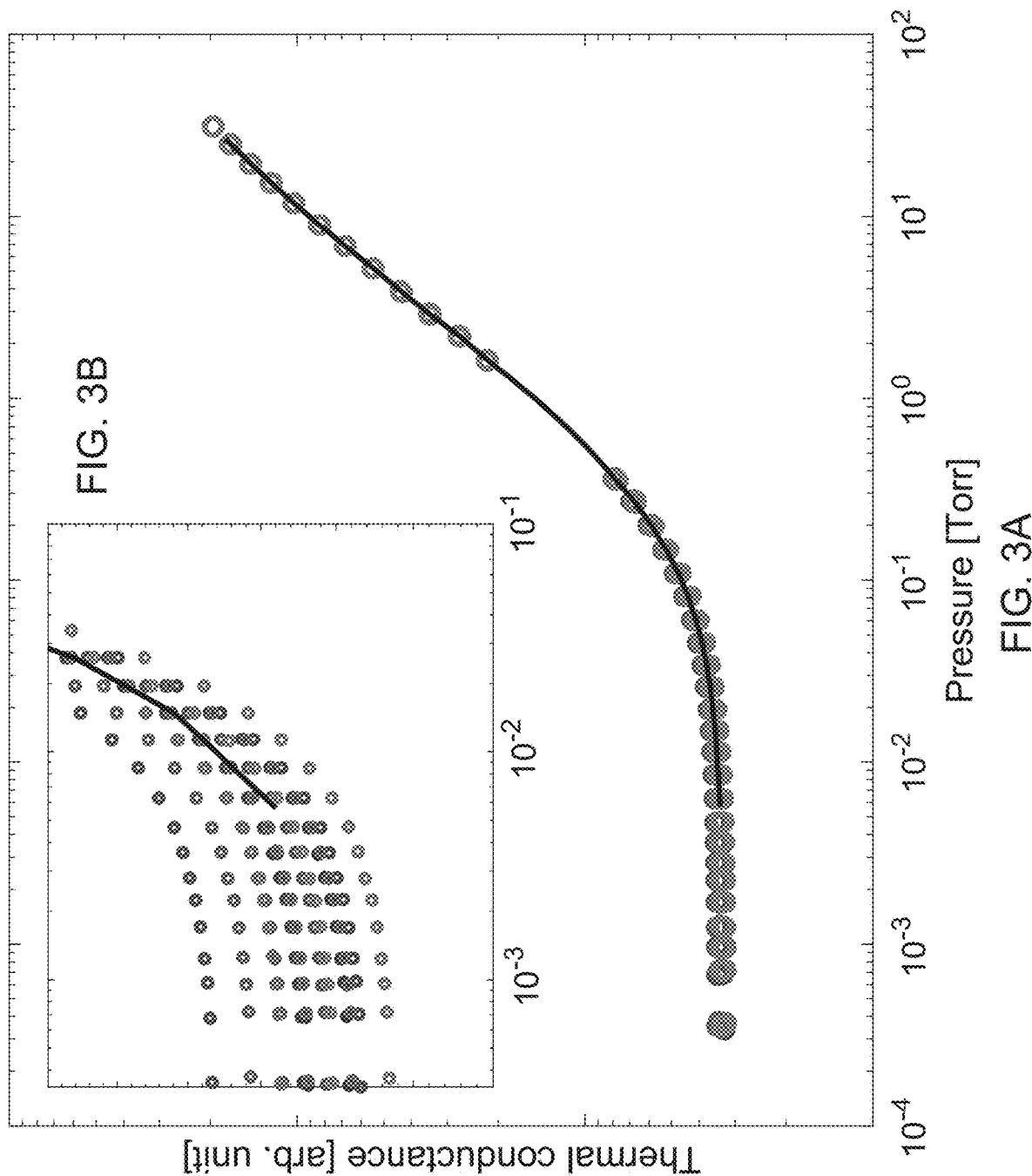
FIG. 3A is a graph on a log-log scale depicting a set of thirteen calibration curves of the thermal conductance versus pressure (open circles) measured with thirteen micro-Pirani gauges from the same wafer.
FIG. 3B is a zoomed-in view of a low-pressure region of FIG. 3A, illustrating how the individual calibration curves deviate from one another below $10^{-2}$ Torr.

Referring to FIG. 3A, there is shown a graph depicting a set of thirteen calibration curves (open circles) of $G_{total}$ versus p obtained from measurements performed on thirteen micro-Pirani gauges fabricated on the same wafer. FIG. 3A also depicts a mean calibration curve (solid line) obtained from a combination of the thirteen individual calibration curves. This mean calibration curve is to be used as the calibration curve by all of the gauges of the wafer for determining pressure from thermal conductance measurements. Referring to FIG. 3B, which is a zoomed-in view of a low-pressure region of FIG. 3A, it is appreciated that the individual calibration curves show significant deviations from one another for pressures below $10^{-2}$ Torr. As described in greater detail below, these deviations may result from fabrication tolerances, which lead to geometrical parameters of the micro-Pirani gauges that vary from place to place over the wafer. It has been found that these fabrication-related deviations may lead to significant errors in the determination of gas pressure, as illustrated in FIG. 4.

Figure 4:
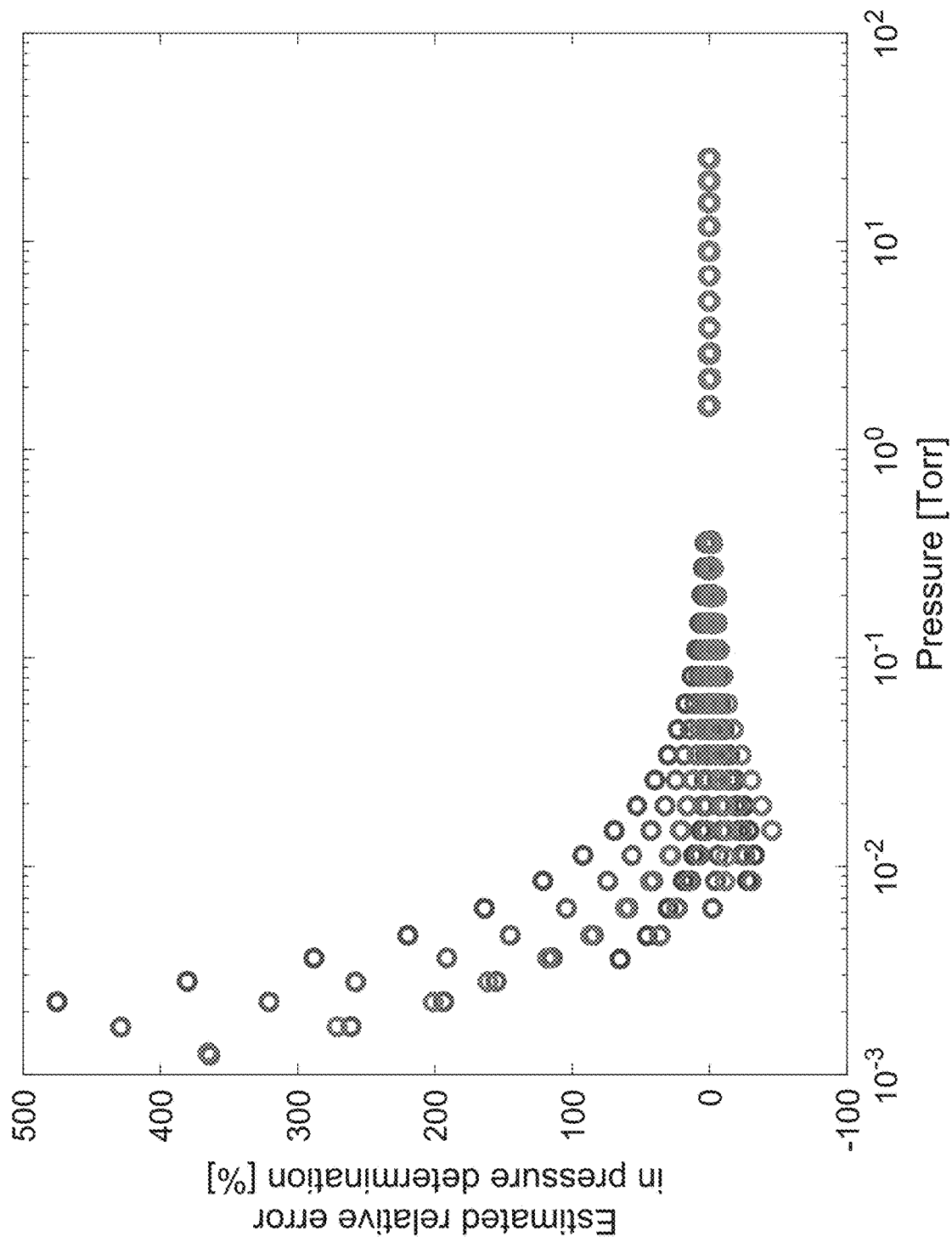
FIG. 4 is a graph depicting thirteen curves of estimated relative error in pressure determination, plotted as functions of pressure on a log scale. The thirteen curves are associated with the thirteen micro-Pirani gauges whose individual calibration curves are depicted in FIG. 3A. Each curve in FIG. 4 represents the estimated relative error in pressure determination resulting from the use of the mean calibration curve shown in FIG. 3A instead of the calibration curve determined for each individual gauge.

FIG. 4 is a graph depicting thirteen curves of estimated relative error in pressure determination, plotted as functions of pressure. These error curves are associated with the thirteen micro-Pirani gauges whose individual calibration curves are depicted in FIG. 3A. Each curve in FIG. 4 represents the estimated relative error in pressure determination resulting from the use of the mean calibration curve of FIG. 3A for all of the gauges. FIG. 4 shows that the relative error increases rapidly as the pressure decreases in the low-pressure range, where $G_{total}$ is dominated by $G_{solid}$, becoming in some cases greater than 100% below $10^{-2}$ Torr. In particular, FIG. 4 indicates that the use of a mean or effective calibration response function derived from a set of experimentally determined individual calibration response functions associated with a corresponding set of gauges located at different positions on a wafer may be detrimental to pressure measurement accuracy for any given gauge.

Fabrication-related dimensional variations are unavoidable in microfabrication processes and limit the performance of micromachined devices. Each fabrication step, such as deposition, patterning, and etching, has associated tolerances. Fabrication tolerances lead to variations in geometrical parameters and material properties, which in turn may lead to performance degradation. For example, photolithography processes can cause deviations from nominal geometrical parameters, and likewise for etching processes, due to over- and under-etching. Thin-film deposition processes are also affected by fabrication variations related to variations in thickness and material properties. In addition to being difficult to control and mitigate, another challenge with fabrication-related dimensional variations is that they generally have a nonuniform spatial distribution over the wafer area. This means that nominally identical devices fabricated at different wafer locations can exhibit significant or at least non-negligible variations in fabrication deviations.

Figure 5:
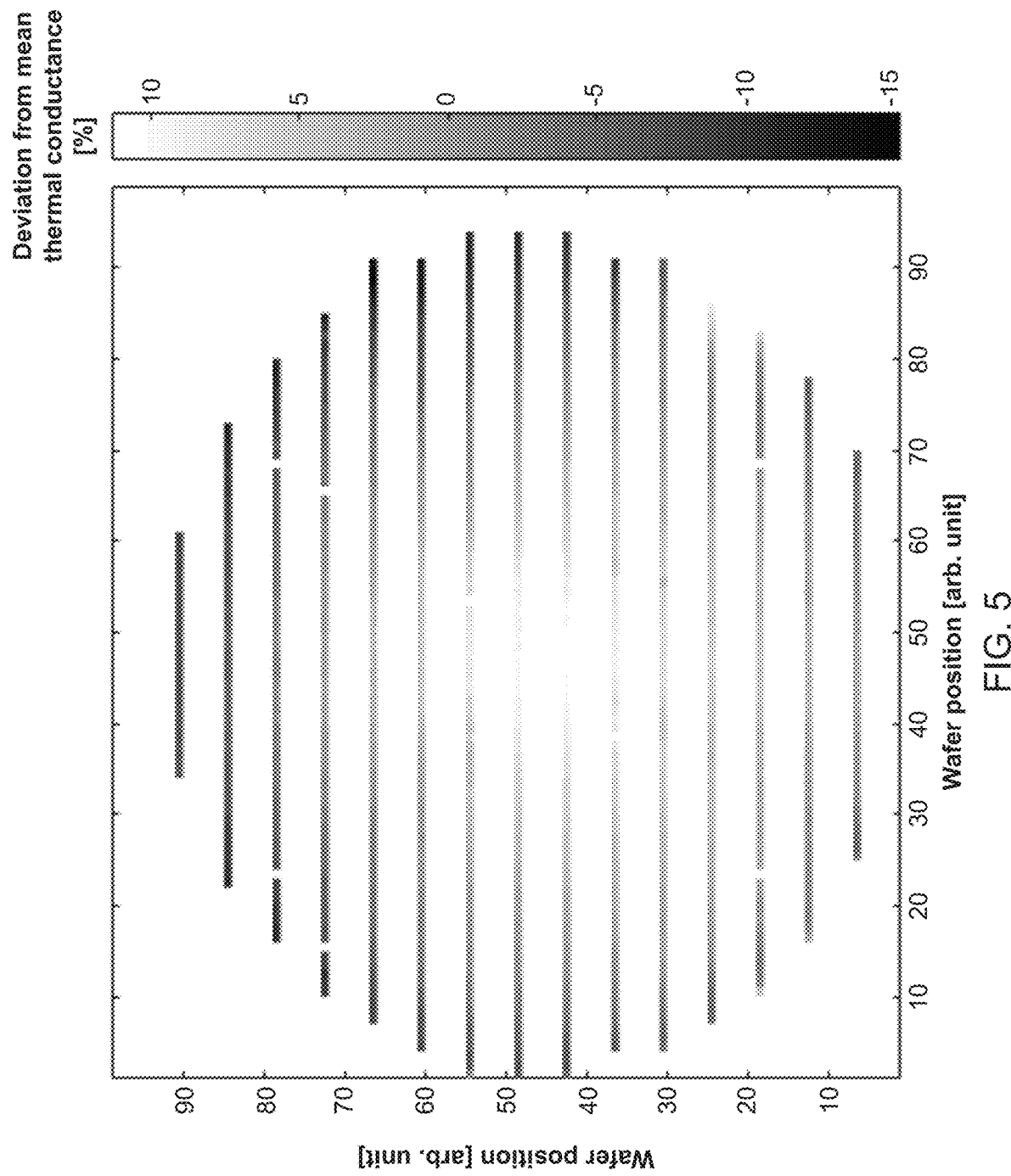
FIG. 5 is a contour plot of low-pressure total thermal conductance measurements made across a wafer of Pirani gauges. The gray scale represents the percent deviation of the measured thermal conductance relative to the mean value measured across the wafer.

This is exemplified in FIG. 5, which is a contour plot of total thermal conductance measurements made across a wafer of nominally identical Pirani gauges. The measurements were made at very low pressure, in a regime where the total thermal conductance is expected to be dominated by the solid thermal conductance. The gray scale represents the percent deviation of the measured thermal conductance relative to the mean value measured across the wafer. FIG. 5 shows that the total thermal conductance is not uniform across the wafer, with variations as high as 25% between certain wafer areas. These local variations in total thermal conductance can be attributed in large part to spatially dependent fabrication variation of the Pirani gauges, notably their support structures. Furthermore, as noted above, the presence of such nonuniformities in the thermal conductance can make the use of a mean or effective calibration response function detrimental to pressure measurement accuracy.

Referring still to FIG. 5, it can also be seen that the nonuniformities in the thermal conductance vary relatively slowly over the surface of the wafer. It follows that dimensional variations related to the manufacturing tolerances (e.g., related to deposition, patterning, and etching) in micro-Pirani gauges that are neighbors or closely spaced on the wafer can be expected to be substantially identical or at least very similar to one another. In particular, this means that two nominally identical micro-Pirani gauges that are adjacent to each other on the wafer would be expected, under reasonable assumptions, to have substantially the same thermal conductance despite the unavoidable presence of fabrication-related dimensional variations. As will be described below, the present techniques make use of the slowly varying nature of the spatial distribution of fabrication-related dimensional variations to design multi-gauge pressure microsensors with enhanced compensation of these variations.

Figure 6:
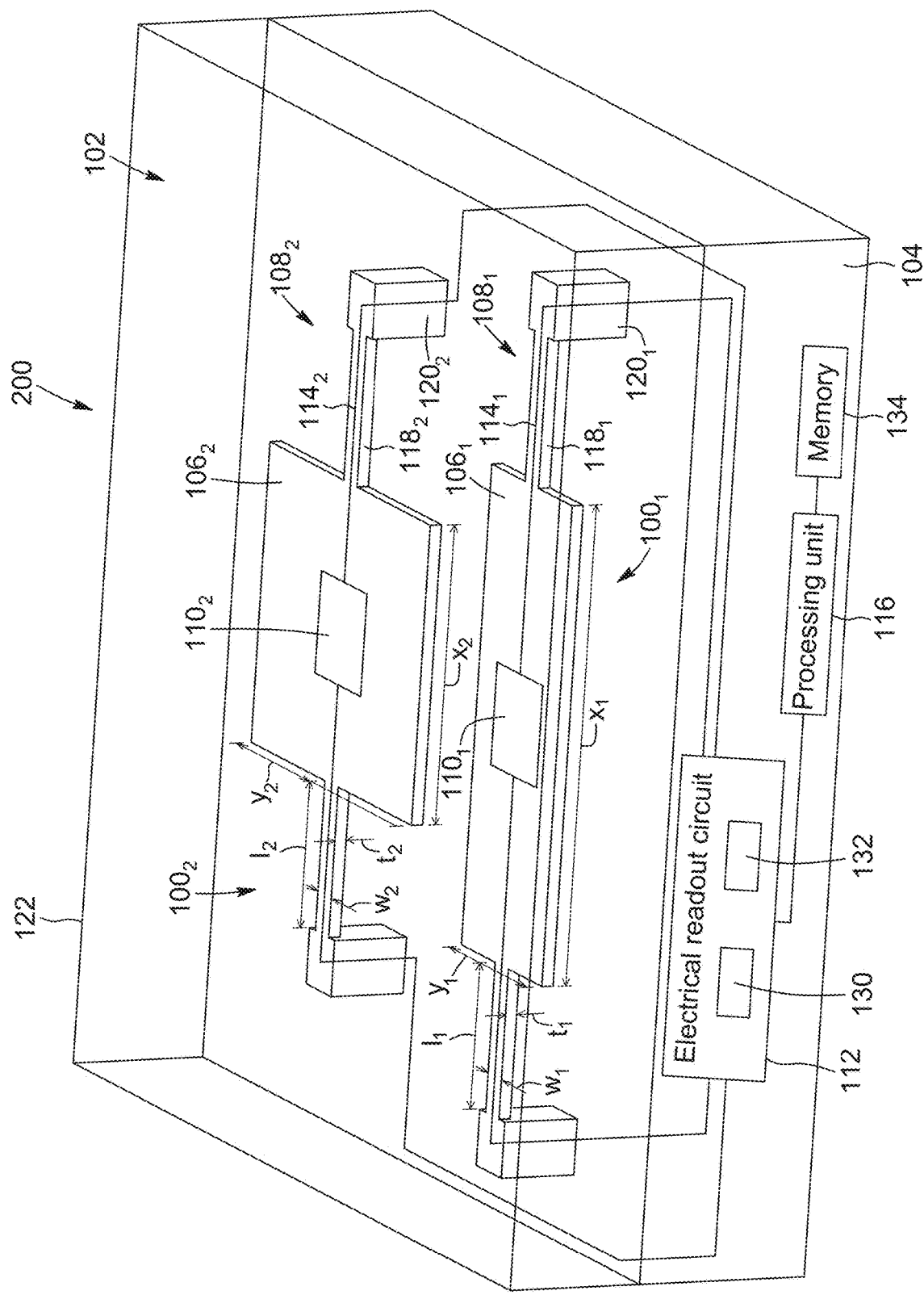
FIG. 6 is a schematic representation of a possible embodiment of a heat-loss pressure microsensor.

Referring to FIG. 6, there is illustrated a possible embodiment of a heat-loss pressure microsensor 200 for measuring a gas pressure in an environment 102. The heat-loss pressure microsensor 200 generally includes a substrate 104 and a pair of pressure gauges $100_1$, $100_2$ exposed to the environment 102. The first and second pressure gauges $100_1$, $100_2$ are arranged proximate to each other on the substrate 104. Depending on the application, the pressure microsensor 200 may or may not include a vacuum package 122 enclosing the pair of pressure gauges $100_1$, $100_2$ thereinside.

In the present description, the term "proximate" is intended to indicate that the spacing between the individual gauges of any given pair of pressure gauges of the pressure microsensor on the substrate is sufficiently small compared to the scale of the spatial nonuniformities of the fabrication-related dimensional variations. As noted above, the fabrication-related dimensional variations tend to vary slowly on the scale of typical distances between neighboring pressure gauges fabricated on a same wafer. Thus, in a given embodiment, the pressure gauges of a pressure microsensor can be said to be proximate to one another if they are located sufficiently close to one another for them to have dimensional variations related to the fabrication tolerances that, although a priori unknown, can be assumed to be substantially the same within tolerances that are acceptable for the proper operation of this embodiment. For example, in some embodiments, the pressure gauges of a pressure microsensor can be considered to be proximate to one another if they are separated by a center-to-center inter-gauge distance ranging from about 40 μm to about 500 μm, although pressure gauges having inter-gauge distances falling outside this range may still be considered proximate in other embodiments. It is appreciated that depending on the size, shape, and arrangement of the pressure gauges, the edge-to-edge distance between two proximate pressure gauges having a certain center-to-center inter-gauge distance will vary. For example, in some implementations, the edge-to-edge distance between two proximate pressure gauges can be as small as 5 μm. It is also appreciated that in the present description, the term "proximate" may be used interchangeably with terms such as "near", "close", "adjacent", and "neighboring", unless stated otherwise.

The substrate 104 is a component of the pressure microsensor 200 that provides mechanical support to the first and second pressure gauges $100_1$, $100_2$. As described above with respect to FIG. 1, the substrate 104 in FIG. 6 may be made of silicon (Si), silicon carbide (SiC), gallium arsenide (GaAs), germanium (Ge), or another suitable material or combination of materials.

Figure 7A:
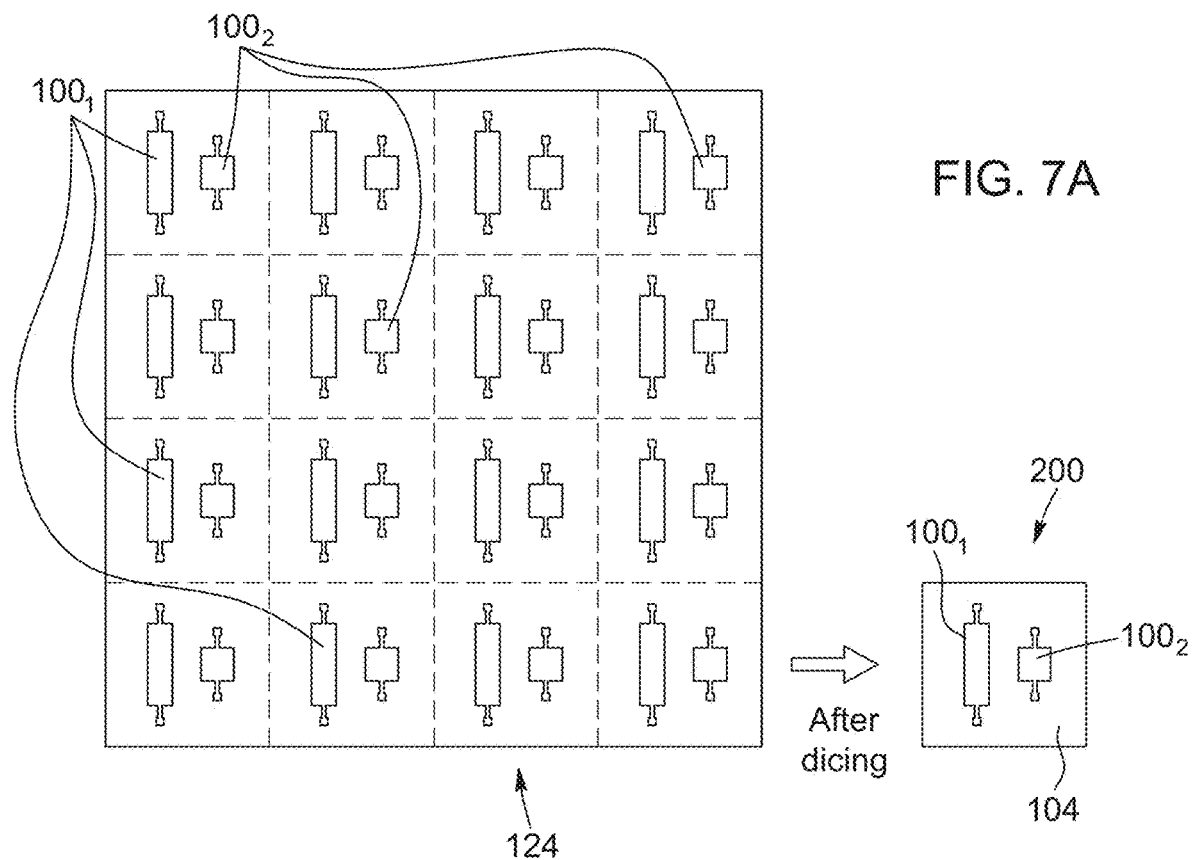
FIG. 7A is a schematic representation of a wafer having a plurality of pairs of pressure gauges fabricated thereon. The wafer can be diced into a plurality of individual dies, where each die constitutes an individual dual-gauge pressure microsensor.
Figure 7B:
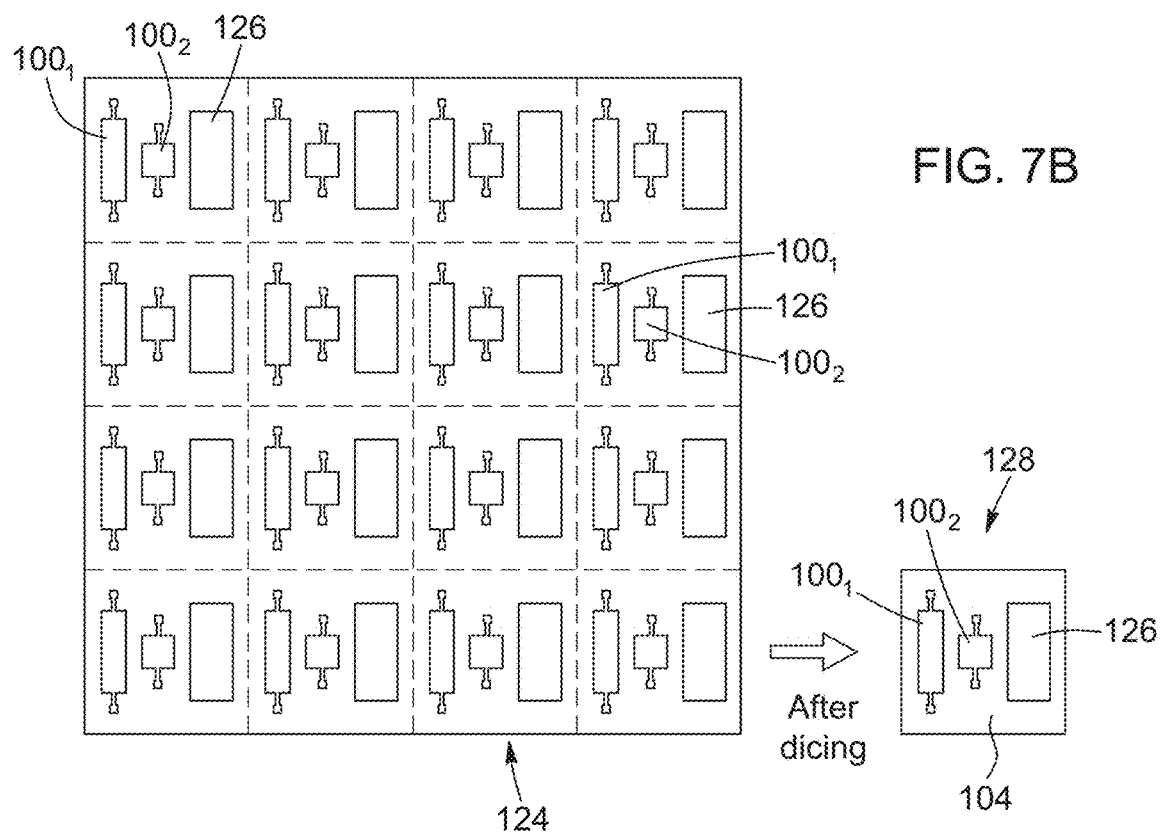
FIG. 7B is a schematic representation of a wafer having a plurality of MEMS devices fabricated thereon, where each MEMS device includes a MEMS and dual-gauge pressure microsensor enclosed in a vacuum package. Each die of the wafer constitutes one of the MEMS devices.

In one embodiment, the substrate 104 may be a die separated from a semiconductor wafer, for example a silicon wafer. This is illustrated in FIG. 7A, which depicts a wafer 124 having a plurality of pairs of pressure gauges $100_1$, $100_2$ fabricated thereon. For simplicity, the wafer 124 in FIG. 7A includes only sixteen pairs of pressure gauges $100_1$, $100_2$, although in practice, as many as thousands of pressure gauge pairs could be fabricated on a single wafer. After the pairs of pressure gauges $100_1$, $100_2$ have been fabricated on the wafer 124, the wafer 124 can be diced into a number of individual dies, so each die constitutes an individual dual-gauge pressure microsensor 200, such as the one depicted in FIG. 6. As noted above, such a pressure microsensor 200 may be incorporated into vacuum-packaged MEMS and MOEMS devices such as uncooled microbolometer focal plane arrays, or into analytical and processing equipment with integrated vacuum systems, such as thin-film deposition apparatuses. Referring to FIG. 7B, in another embodiment, the substrate 104 may be one of a number of dies separated from a wafer 124, where each individual die includes not only a dual-gauge pressure microsensor 200, but also a MEMS 126 or any type of microdevices operating in a vacuum environment, both of which enclosed in the same vacuum package to form a MEMS device 128. Dice lines are represented as dashed lines in FIGS. 7A and 7B.

Returning to FIG. 6, the first pressure gauge $100_1$ can include a first thermistor $110_1$ having an electrical resistance $R_1$ that varies with changes in its temperature $T_1$, which temperature changes can result from variations in gas pressure p in the environment 102; a first platform $106_1$ configured to receive the first thermistor $110_1$ in a spaced-apart relationship from the substrate 104; and a first support structure $108_1$ configured to hold the first platform $106_1$ above the substrate 104. Similarly, the second pressure gauge $100_2$ can include a second thermistor $110_2$ having an electrical resistance $R_2$ that varies with changes in its temperature $T_2$, which temperature changes can result from variations in gas pressure p in the environment 102; a second platform $106_2$ configured to receive the second thermistor $110_2$ in a spaced-apart relationship from the substrate 104; and a second support structure $108_2$ configured to hold the second platform $106_2$ above the substrate 104.

It is appreciated that the structure, composition, and operation of the platforms $106_1$, $106_2$, the support structures $108_1$, $108_2$, and the thermistors $110_1$, $110_2$ of the first and second pressure gauges $100_1$, $100_2$ of FIG. 6 may be similar to those described above with respect to the platform 106, the support structure 108, and the thermistor 110 of the pressure gauge 100 depicted in FIG. 1.

In FIG. 6, each one of the first and second platforms $106_1$, $106_2$ is embodied by a substantially planar structure suspended above the substrate 104 and made of an electrically insulating, mechanically self-supportive, and low-stress material, such as silicon nitride and silicon dioxide. In particular, each one of the first and second platforms $106_1$, $106_2$ is shaped as a rectangle, with lateral dimensions $x_1$ and $y_1$, perimeter $P_1=2(x_1+y_1)$, and surface area $S_1=x_1y_1$ for the first platform $106_1$ and lateral dimensions $x_2$ and $y_2$, perimeter $P_2=2(x_2+y_2)$, and surface area $S_2=x_2y_2$ for the second platform $106_2$. The support structure $108_1$ of the first pressure gauge $100_1$ includes two arms $118_1$ extending outwardly from opposite edges of the platform $106_1$, each arm $118_1$ having a length $l_1$, a width $w_1$, a thickness $t_1$, and a cross-sectional area $A_1=w_1t_1$, and two posts $120_1$ connecting the two arms $118_1$ to the substrate 104. Likewise, the support structure $108_2$ of the second pressure gauge $100_2$ includes two arms $118_2$ extending outwardly from opposite edges of the platform $106_2$, each arm $118_2$ having a length $l_2$, a width $w_2$, a thickness $t_2$, and a cross-sectional area $A_2=w_2t_2$, and two posts $120_2$ connecting the two arms $118_2$ to the substrate 104. The first and second thermistors $110_1$, $110_2$ may each be made of any suitable resistive material having an electrical resistance $R_1$, $R_2$ that varies with its temperature $T_1$, $T_2$, generally in a predictable and controllable manner. For example, in one embodiment, the thermistors $110_1$, $110_2$ may be made of vanadium oxide ($VO_x$). As discussed in greater detail below, the platforms $106_1$, $106_2$, support structures $108_1$, $108_2$, and thermistors $110_1$, $110_2$ may assume a variety of shapes, dimensions, and configurations to meet the requirements or preferences of a given application.

Referring still to FIG. 6, the first pressure gauge $100_1$ is configured to produce a first gauge output signal, which may be an electrical signal (e.g., a voltage or current) related to or indicative of the electrical resistance $R_1$ of the first thermistor $110_1$. Likewise, the second pressure gauge $100_2$ is configured to produce a second gauge output signal, which may be an electrical signal (e.g., a voltage or current) related to or indicative of the electrical resistance $R_2$ of the second thermistor $110_2$. Both the first and second gauge output signals convey information about the gas pressure in the environment 102. It is appreciated that by providing the first and second pressure gauges $100_1$, $100_2$ with different nominal geometries, the first and second gauge output signals can be different from each other, such that a differential signal calculated or obtained from the measured first and second gauge output signals can be used to determine the gas pressure in the environment 102.

Figure 8:
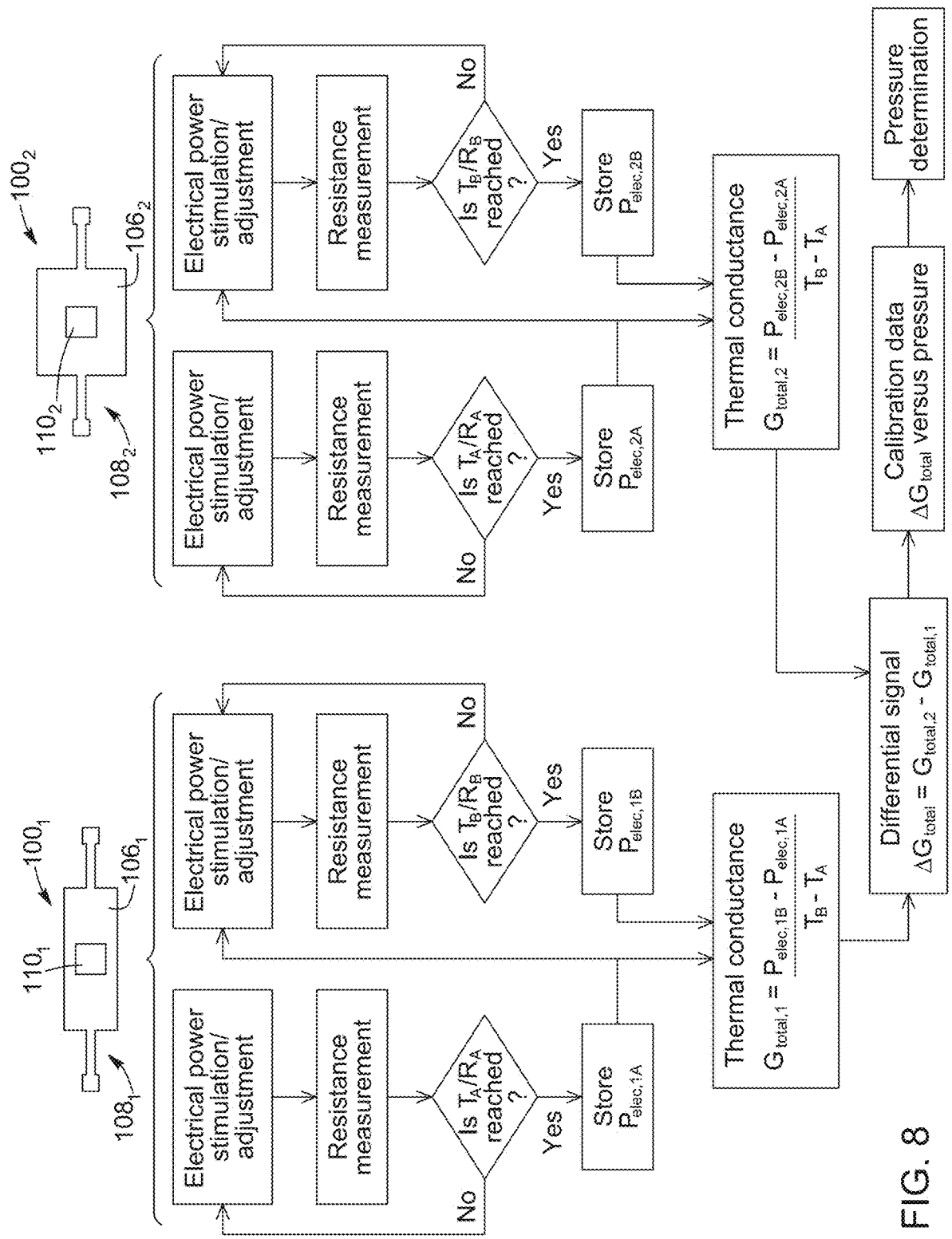
FIG. 8 is a flow diagram of a method for measuring gas pressure, in accordance with a possible embodiment.

Referring to FIG. 8, in one embodiment, the above-described dual-temperature pressure measurement technique may be implemented to obtain the first and second gauge output signals. In such a case, the first gauge output signal may be an electrical signal representative of a first amount of applied electrical power $\Delta P_{elec,1}$ for varying the electrical resistance $R_1$ of the first thermistor $110_1$ between two resistance values corresponding to a change in a temperature $T_1$ of the first thermistor $110_1$ between two predetermined temperature values, $T_A$ and $T_B$. Likewise, the second gauge output signal may be an electrical signal representative of a second amount of applied electrical power $\Delta P_{elec,2}$ for varying the electrical resistance $R_2$ of the second thermistor $110_2$ between two resistance values corresponding to a change in a temperature $T_2$ of the second thermistor $110_2$ between the same two predetermined temperature values $T_A$ and $T_B$, for simplicity, or a different pair of predetermined temperature values. For example, obtaining $\Delta P_{elec,1}$ may include iterative steps of electrical power stimulation/adjustment and electrical resistance measurement to determine the amounts of electrical power $P_{elec,1A}$ and $P_{elec,1B}$ needed for the temperature $T_1$ of the first thermistor $110_1$ to reach $T_A$ and $T_B$, respectively, where $\Delta P_{elec,1}=P_{elec,1B}-P_{elec,1A}$. Likewise, obtaining $\Delta P_{elec,2}$ may include iterative steps of electrical power stimulation/adjustment and electrical resistance measurement to determine the amounts of electrical power $P_{elec,2A}$ and $P_{elec,2B}$ needed for the temperature $T_2$ of the second thermistor $110_2$ to reach $T_A$ and $T_B$, respectively, where $\Delta P_{elec,2}=P_{elec,2B}-P_{elec,2A}$.

It is appreciated that various techniques may be used to determine the amounts of electrical power $P_{elec,1A}$ and $P_{elec,1B}$ associated with the first pressure gauge $100_1$ and the amounts of electrical power $P_{elec,2A}$ and $P_{elec,2B}$ associated with the second pressure gauge $100_2$. For this purpose, the pressure microsensor 200 may include an electrical readout circuit 112, which may be formed on, in, or outside of the substrate 104. The electrical readout circuit 112 may be configured to measure, for each one of the pressure gauges $100_1$, $100_2$ the changes in the electrical resistance of the respective thermistor $110_1$, $110_2$ resulting from heat transfer to its surroundings, and to provide a gauge output signal (e.g., a voltage or a current) representative of the measured changes in electrical resistance. Each pressure gauge $100_1$, $100_2$ may include a respective electrode structure $114_1$, $114_2$ configured to electrically connect its thermistor $110_1$, $110_2$ to the electrical readout circuit 112. Depending on the application, the components of the electrical readout circuit 112 associated with the first pressure gauge $100_1$ may be identical to or different from the components associated with the second pressure gauge $100_2$.

Returning to FIG. 6, the electrical readout circuit 112 may include an electrical power supply 30, for example a voltage or a current source, configured to apply electrical power to the thermistors $110_1$, $110_2$. The electrical power supply 130 may be configured to apply electrical stimulations to the first thermistor $110_1$ to bring its temperature $T_1$ (or equivalently its resistance $R_1$) to certain predetermined values, and likewise for the second thermistor $110_2$. Depending on the application, the electrical power supply 130 may be provided internally to the electrical readout circuit 112, as in FIG. 6, or externally thereto. The electrical power supply 130 may be embodied by a single or a plurality of distinct source devices, which may or may not be the same for the first and second pressure gauge $100_1$, $100_2$. The electrical readout circuit 112 may also include an electrical measurement module 132 configured to monitor, either directly or indirectly, the electrical resistance $R_1$ of the first thermistor $110_1$ in response to electrical stimulations applied by the electrical power supply 130, and likewise for the electrical resistance $R_2$ of the second thermistor $110_2$. For example, the electrical measurement module 132 may include a voltmeter, an ammeter, a wattmeter, an ohmmeter or any other appropriate electrical measuring device, or a combination thereof. It is appreciated that various structures, configurations, and methods of operation may be used for the electrical readout circuit 112. Non-limiting examples are disclosed in co-assigned U.S. Pat. Nos. 8,171,801 and 8,748,808, the contents of the latter being also incorporated herein by reference in their entirety.

From Eq. (4), the thermal conductances $G_{total,1}(p)$ and $G_{total,2}(p)$ of the first and second pressure gauges $100_1$, $100_2$ may be calculated or otherwise determined from the electrical measurements as $G_{total,1}(p)=\Delta P_{elec,1}/\Delta T_1$ and $G_{total,2}(p)=\Delta P_{elec,2}/\Delta T_2$, respectively, where $\Delta T_1$ and $\Delta T_2$ may or may not be the same. The values of $G_{total,1}(p)$ and $G_{total,2}(p)$ thus obtained can be used to calculate or otherwise determine a differential signal $\Delta G_{total}(p)$ of the dual-gauge pressure microsensor 200, as follows:

$$\Delta G_{total}(p) = G_{total,2}(p) - G_{total,1}(p). \quad (5)$$

The differential signal $\Delta G_{total}(p)$ may then be used to determine the gas pressure p in the environment 102, for example by referring to calibration data, for example a calibration curve or a lookup table, relating $\Delta G_{total}(p)$ to the gas pressure p over a certain pressure range.

For this purpose, the pressure microsensor 200 may further include or be connected to a processing unit 116 configured to receive the first and second gauge output signals from the electrical readout circuit 112 and process these signals in order to determine the differential signal and, therefrom, the gas pressure in the environment 102. The processing unit 116 may also be operatively coupled to the other components of the pressure microsensor 200, for example the electrical power supply 130 and the electrical measurement module 132 of the electrical readout circuit 112, to control and coordinate, at least partly, their operation.

The processing unit 116 may be provided within one or more general purpose computers and/or within any other suitable computing devices. The processing unit 116 may be implemented in hardware, software, firmware, or any combination thereof, and connected to other components of the pressure microsensor 200, for example the electrical readout circuit 112, via appropriate wired and/or wireless communication links and ports. Depending on the application, the processing unit 116 may be integrated to, partly integrated to, or distinctly separate from the electrical readout circuit 112. The processing unit 116 may implement operating systems and may be able to execute computer programs. It is appreciated that the term "processing unit" should not be construed as being limited to a single processor, and accordingly, any known processor architecture may be used. For example, the processing unit 116 may include or be part of a computer; a microprocessor; a microcontroller; a digital signal processor (DSP) running on a system on a chip (SoC); a single-board computer (SBC); a special-purpose programmable logic device embodied in hardware device, such as a field-programmable gate array (FPGA); and/or any other suitable devices configured to electronically process information and to operate collectively as a processing unit.

The pressure microsensor 200 may further include or be connected to a memory 134 capable of storing computer programs and other data to be retrieved by the processing unit 116, for example a calibration curve or a lookup table for a calibration curve or a lookup table for the differential signal $\Delta G_{total}$ as a function of pressure. The memory 134 may be embodied by any suitable type of computer data storage device or assembly of such devices, including random-access memories (RAMs), read-only memories (ROMs), magnetic and optical storage devices, flash drive memories; and/or other non-transitory memory technologies. A plurality of such storage devices may be provided, as can be appreciated by those skilled in the art.

It is appreciated that other embodiments may measure or obtain the first and second gauge output signals, and calculate or determine therefrom the differential signal, based on techniques different from the dual-temperature pressure measurement technique mentioned above. In such a case, the structure, configuration, and operation of the electrical readout circuit 112, processing unit 116, and memory 134 may be adapted in accordance with the specific technique used for pressure measurement.

It is also appreciated that the differential signal obtained from the first and second gauge output signals may be a simple subtraction, or a more complex differential function from which a difference between the first and second gauge output signals may be evaluated or ascertained. For example, a subtraction between the first and second output gauge signals could be scaled and/or the first and second output gauge signals could be scaled prior to being subtracted one from the other. Furthermore, it is noted that the expression "a differential signal obtained from the first and second gauge output signals" is intended to encompass both scenarios where the differential signal is obtained solely from the first and second gauge output signals (e.g., by subtracting one from the other) and scenarios where additional gauge output signals are used along with the first and second gauge output signals to obtain the differential signal (e.g., by using four gauge output signals, as described below).

As will now be described, by designing the first and second pressure gauges $100_1$, $100_2$ in accordance with certain geometrical design rules, and based on the assumption that the gauges $100_1$, $100_2$ suffer from substantially the same fabrications variations, the differential signal $\Delta G_{total}(p)$ may be made less sensitive to the fabrication tolerances than either of $G_{total,1}(p)$ and $G_{total,2}(p)$.

Figure 9:
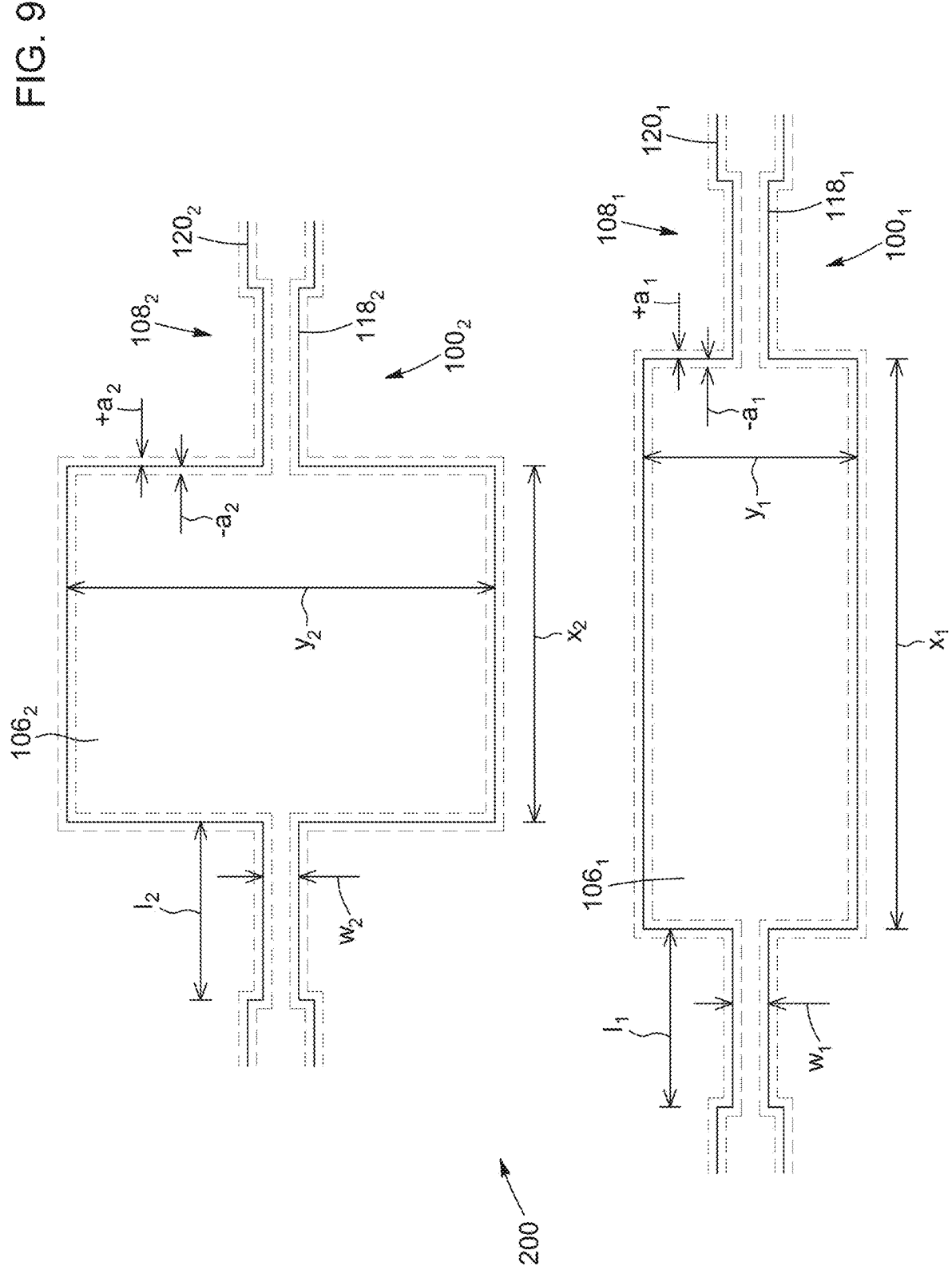
FIG. 9 is a schematic top view of the pressure microsensor of FIG. 6, depicting the platforms and the support structures of the first and second pressure gauges, where the solid lines correspond to nominal dimensions and the dashed lines correspond to dimensional tolerances related to the fabrication process of the first and second pressure gauges.

FIG. 9 is a schematic top view of the pressure microsensor 200 of FIG. 6, depicting the platforms $106_1$, $106_2$ and the support structures $108_1$, $108_2$ of the first and second pressure gauges $100_1$, $100_2$. In FIG. 9, solid lines correspond to nominal dimensions (i.e., $x_1$, $y_1$ and $x_2$, $y_2$ for the first and second platforms $106_1$, $106_2$, and $l_1$, $w_1$ and $l_2$, $w_2$ for the first and second support structures $108_1$, $108_2$), while dashed lines correspond to dimensional tolerances $\pm a_1$ and $\pm a_2$ related to the fabrication process of the first and second pressure gauges $100_1$, $100_2$, for example due to under-etching ($+a_1$ and $+a_2$) or over-etching ($-a_1$ and $-a_2$). As noted above, because the first and second pressure gauges $100_1$, $100_2$ are proximate to each other on the substrate 104, their fabrication-related dimensional variations $\pm a_1$ and $\pm a_2$, although a priori unknown, may be considered to be the same. That is, it is assumed that $\pm a_1 = \pm a_2 = \pm a$, as is denoted in FIG. 9. For example, in some embodiments, the fabrication tolerances $\pm a$ due to under-etching and over-etching and patterning tolerances may be of the order of about 5% to about 20% of the nominal dimensions.

From Eq. (2), and assuming that $G_{rad}$ can be neglected compared to $G_{solid}$ and $G_{gas}$, the total thermal conductance $G_{total,i}$ of either of the gauges $100_1$, $100_2$ depicted in FIGS. 6 and 9 may be written as follows:

$$G_{total,i}(p) = G_{solid,i} + G_{gas,i}(p) \qquad (6)$$

$$= k_{solid}\left(\frac{A_i}{L_i}\right) + k_{gas}(p)S_i,$$

where i=1 or 2, $k_{solid}$ is the effective thermal conductivity of the support structure $108_i$, $k_{gas}(p)$ is a factor that depends, inter alia, on the pressure p and thermal conductivity of the gas in the environment 102 and the height of the platform $106_i$ above the substrate 104, and $L_i$ is the effective length of the thermal conductivity path defined by the support structure $108_i$ between the platform $106_i$ and the substrate 104. In Eq. (6), $k_{solid}$ and $k_{gas}(p)$ are assumed to be nominally the same for the two gauges.

Using $A_i = (w_i \pm 2a_i)t_i$, $L_i = 2(l_i \pm 2a_i)$, and $S_i = (x_i \pm 2a_i)(y_i \pm 2a_i)$, and assuming that $a_i = a$ and $t_i = t$, Eq. (6) becomes $$G_{total,i}(p) = \left(\frac{k_{solid}t}{2}\right)\left[\frac{(w_i \pm 2a)}{(l_i \mp 2a)}\right] + k_{gas}(p)[(x_i \pm 2a)(y_i \pm 2a)]. \qquad (7)$$

By substituting Eq. (7) into Eq. (5) and rewriting Eq. (5) as the sum of two terms, $\Delta G_{solid} = (G_{solid,2} - G_{solid,1})$, related to solid thermal conduction, and $\Delta G_{gas}(p) = [G_{gas,2}(p) - G_{gas,1}(p)]$, related to gas thermal conduction, the following equations can be obtained for $\Delta G_{solid}$ and $\Delta G_{gas}(p)$, which depend on the fabrication tolerance $\pm a$:

$$\Delta G_{solid} = \left(\frac{k_{solid}t}{2}\right)\left[\frac{(w_2 \pm 2a)}{(l_2 \mp 2a)} - \frac{(w_1 \pm 2a)}{(l_1 \mp 2a)}\right] \qquad (8)$$

$$= \left(\frac{k_{solid}t}{2}\right)\left[\frac{l_1 w_2 - l_2 w_1 \mp 2a(l_2 - l_1 + w_2 - w_1)}{(l_2 \mp 2a)(l_1 \mp 2a)}\right],$$

-continued
$$\Delta G_{gas}(p) = k_{gas}(p)[(x_2 \pm 2a)(y_2 \pm 2a) - (x_1 \pm 2a)(y_1 \pm 2a)] \qquad (9)$$

$$= k_{gas}(p)[x_2 y_2 - x_1 y_1 \pm 2a(x_2 + y_2 - x_1 - y_1)].$$

It can be found that the factors that multiply $\pm 2a$ will vanish in Eqs. (8) and (9) by enforcing two design rules.

The first design rule is to provide the first and second pressure gauges $100_1$, $100_2$ with support structures $108_1$, $108_2$ having the same nominal geometry, so that $l_1 = l_2$ and $w_1 = w_2$, leading to $G_{solid,1} = G_{solid,2}$, and thus $\Delta G_{solid} = 0$ in Eq. (8). It is appreciated that the expression "having the same nominal geometry" is understood to mean that the nominal geometry of the first support structure $108_1$ and the nominal geometry of the second support structure $108_2$ are configured or designed to be substantially the same, that is, the same within tolerances that are acceptable for the proper operation of a particular embodiment. Furthermore, under the assumption that the first and second pressure gauges $100_1$, $100_2$ are sufficiently close to each other to suffer from the same fabrication-related dimensional variations, their nominally identical support structures $108_1$, $108_2$ may also be assumed to be actually identical.

The second design rule is to provide the first and second pressure gauges $100_1$, $100_2$ with platforms $106_1$, $106_2$ having equal nominal perimeters but different nominal surface areas, so that in Eq. (9) the term $\pm 2a(x_2 + y_2 - x_1 - y_1)$ vanishes while the term $(x_1 y_1 - x_2 y_2)$ does not. It is appreciated that the expression "having equal nominal perimeters" is understood to mean that the perimeter of the first platform $106_1$ and the perimeter of the second platform $106_2$ are configured or designed to be substantially the same, that is, the same within tolerances that are acceptable for the proper operation of a particular embodiment. Furthermore, under the assumption that the first and second pressure gauges $100_1$, $100_2$ are sufficiently close to each other to suffer from the same fabrication-related dimensional variations, the perimeters of their platforms $106_1$, $106_2$ may be assumed to be not only nominally identical, but also actually identical.

When these two design rules are enforced, Eq. (5) reduces to the following expression:

$$\Delta G_{total}(p) = \Delta G_{gas}(p) = k_{gas}(p)(x_2 y_2 - x_1 y_1) \qquad (10)$$

Eq. (10) indicates that the differential signal $\Delta G_{total}(p)$ from which the gas pressure p may be determined becomes simply proportional to the difference between the nominal surface areas $x_1 y_1$ and $x_2 y_2$ of the platforms $106_1$, $106_2$ of the first and second pressure gauges $100_1$, $100_2$. In some embodiments, the nominal surface areas of the first and second platforms $106_1$, $106_2$ may range from about 100 µm² to about 100,000 µm², although values outside this range may be used in other embodiments.

As can be appreciated, the differential signal $\Delta G_{total}(p)$ in Eq. (10) may be made substantially independent of the a priori unknown fabrication-related dimensional variations that may affect the geometry of the platforms $106_1$, $106_2$ (e.g., $x_1$ and $y_1$ for the first platform $106_1$, and $x_2$ and $y_2$ for the second platform $106_2$) and the geometry of the support structures $108_1$, $108_2$ (e.g., $l_1$, $w_1$, and $t_1$ for the first support structure $108_1$, and $l_2$, $w_2$, and $t_2$ for the second support structure $108_2$). As such, the differential signal $\Delta G_{total}(p)$ of the pair of pressure gauges $100_1$, $100_2$ may be less sensitive to fabrication-related dimensional variations than either of the signals $G_{total,1}$ and $G_{total,2}$ obtained from the individual pressure gauges $100_1$, $100_2$.

As a result, it may be possible to calibrate a large number (e.g., up to thousands or more) of nominally identical pairs of adjacent pressure gauges fabricated on the same wafer (see, e.g., FIGS. 7A and 7B) by calibrating only a single one of the pairs. This is despite the fact that gauge pairs located far from one another on a same wafer may suffer from different fabrication-related dimensional variations. The calibration of a single gauge pair can involve a determination of a calibration curve or a lookup table relating the differential thermal conductance $\Delta G_{total}(p)$ of the pair as a function of gas pressure p over a certain pressure range. This single-pair calibration curve or lookup table may then be used by all of the pairs fabricated on the wafer, even though the gauge pairs may be used in different and unrelated devices, systems, or applications after the dicing of the wafer into individual dies.

In some embodiments, rather than using a single-pair calibration curve, individual calibration curves from a reduced number of gauge pairs located at various places on a wafer may be determined and then combined to yield a mean or effective calibration curve, which may then be used by all of the gauge pairs of the wafer. In such embodiments, the use of a mean or effective calibration curve may provide reduced sensitivity to fabrication tolerances compared to a mean or effective calibration curve obtained by combining single-gauge calibration curves of individual gauges located at different places on the wafer, such as the one depicted in FIGS. 3A and 3B.

It is to be noted that the term $k_{gas}(p)$ depends, among other parameters, on the gap between the suspended platform $106_1$, $106_2$ and the underlying substrate 104 (see, e.g., co-assigned U.S. Pat. No. 8,171,801). Thus, the differential signal $\Delta G_{total}(p)$ in Eq. (10) will generally depend on the fabrication tolerances associated with the platform gap. In practice, however, the platform gap is a relatively well-controlled fabrication parameter, such that the fabrication-related dimensional variations affecting the platform gap may often be assumed not to vary substantially from place to place on a wafer. In such a case, a calibration curve or a lookup table for the differential signal $\Delta G_{total}(p)$ of a given pair of neighboring pressure pairs may still be validly used for other gauge pairs on the wafer. Furthermore, if the gas pressure is sufficiently low, for example if it is less than about 0.1 Torr, the dependence on the platform gap in the term $k_{gas}(p)$ may be safely neglected. In such a case, the differential signal $\Delta G_{total}(p)$ in Eq. (10) may be effectively assumed to be independent of wafer position, irrespective of fabrication-related dimensional variations affecting the platform gap.

In FIGS. 6 and 9, the first and second platforms $106_1$, $106_2$ are shaped as two rectangles of dimensions $x_1$, $y_1$ and $x_2$, $y_2$, respectively, which have the same nominal perimeters but different nominal surfaces areas, that is, $2(x_1+y_1)=2(x_2+y_2)$ and $x_1y_1 \neq x_2y_2$. It is appreciated that for a rectangular platform having a nominal perimeter $2(x_i+y_i)$, the largest nominal surface $x_iy_i$ occurs when $x_i=y_i=z_i$, that is, for a square platform, as illustrated for the gauge $100_2$ in FIG. 10.

Figure 10:
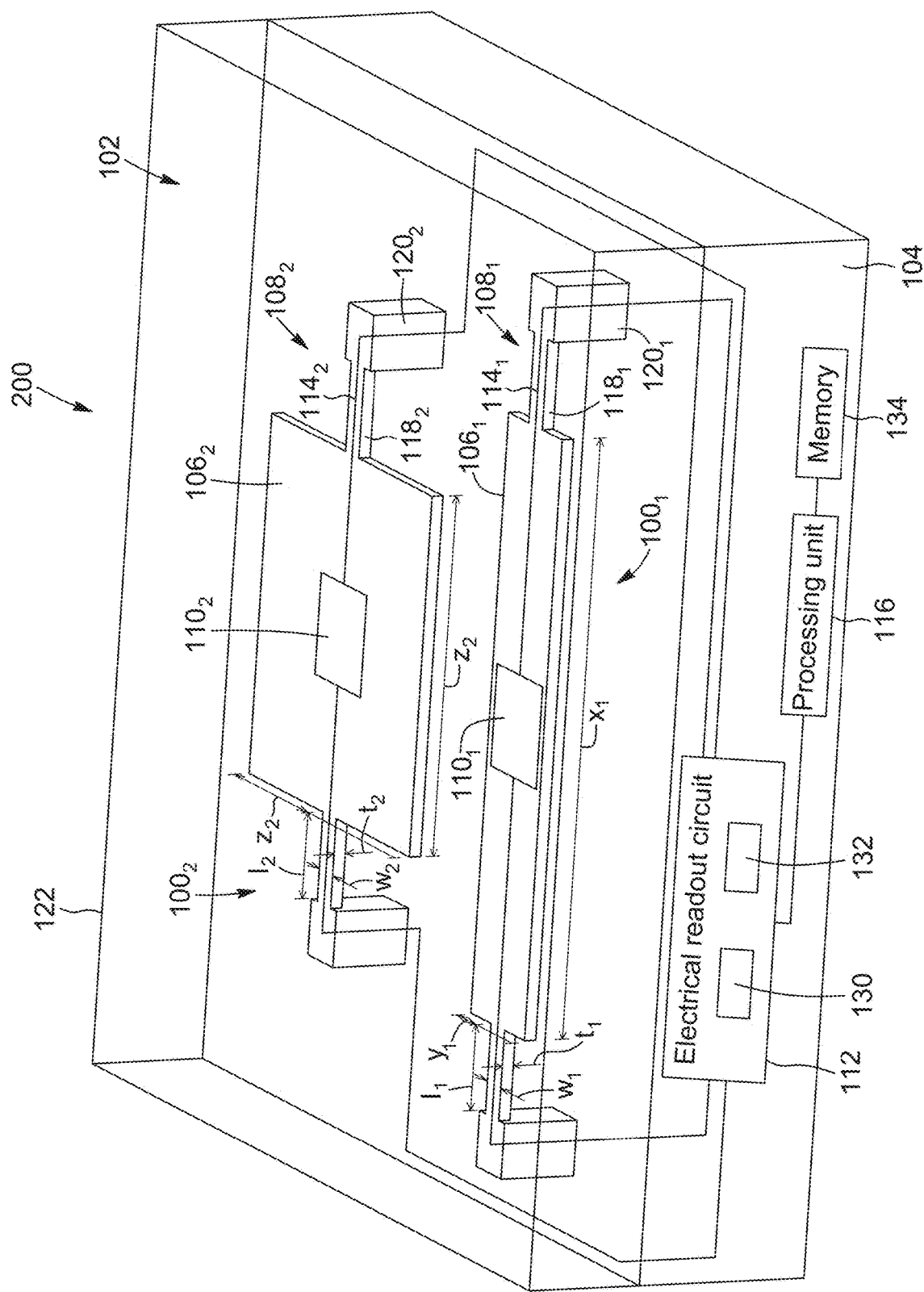
FIG. 10 is a schematic representation of another possible embodiment of a heat-loss pressure microsensor.
Figure 11A:
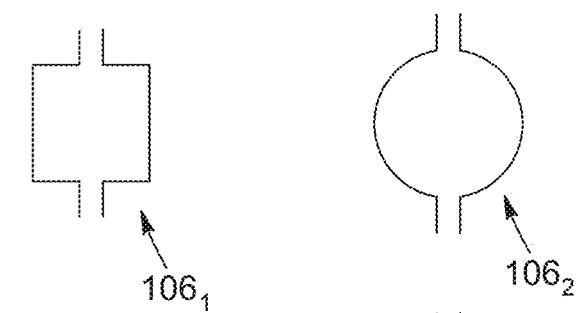
FIGS. 11A to 11E are schematic representations of possible examples of unmatched pairs of platform shapes having the same nominal perimeters but different nominal surface areas.
Figure 11B:
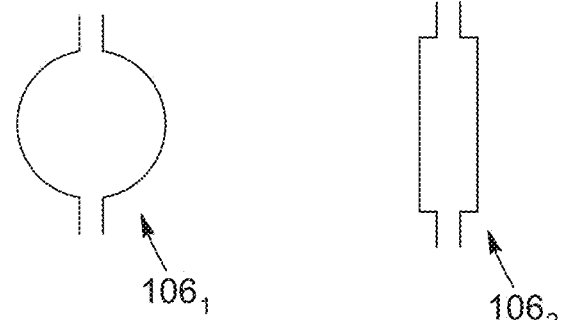
Figure 11C:
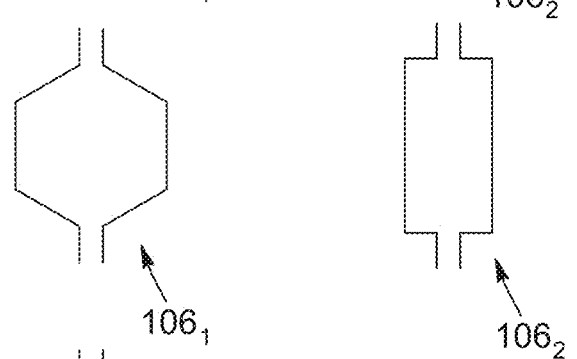
Figure 11D:
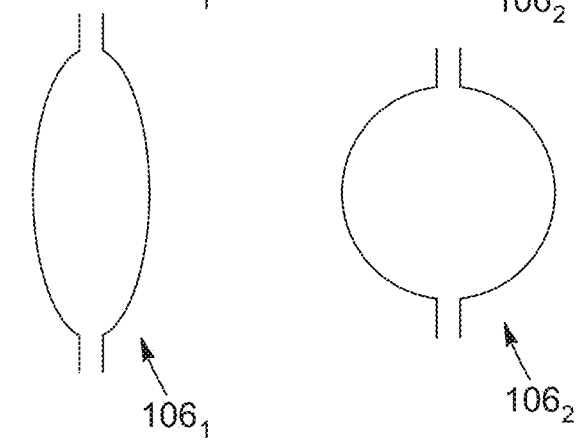
Figure 11E:
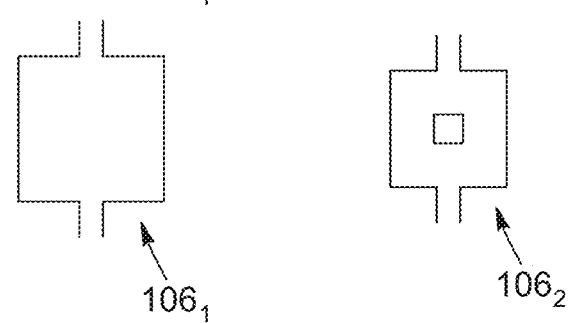

FIG. 10 is another embodiment of a heat-loss dual-gauge pressure microsensor 200 having a first pressure gauge $100_1$ and a second pressure gauge $100_2$ arranged proximate to each other on a substrate 104. Each pressure gauge $100_1$, $100_2$ includes a platform $106_1$, $106_2$, and support structure $108_1$, $108_2$, and a thermistor $110_1$, $110_2$, which can be similar to those described above with respect to FIGS. 1, 6, and 9. In FIG. 10, the platform $106_1$ of the first pressure gauge $100_1$ is shaped as a rectangle of dimensions $x_1$, $y_1$, with $x_1 \neq y_1$, and the platform $106_2$ of the second pressure gauge $100_2$ is shaped as a square of side length $z_2$. Also, the first and second pressure gauges $100_1$, $100_2$ are fabricated to obey the above-described design rules, such that their support structures $108_1$, $108_2$ are configured to have the same nominal geometry and their platforms $106_1$, $106_2$ are configured to have the same nominal perimeters, that is, $4z_2=2(x_1+y_1)$, but different nominal surface areas, that is, $z_2^2 \neq x_1y_1$. In this case, the ratio $R_{area}$ of the nominal platform area $x_1y_1$ of the first platform $106_1$ to the nominal platform area $z_2^2$ of the second platform $106_2$ can be written as follows:

$$R_{area} = \frac{x_1y_1}{z_2^2} = \frac{4x_1y_1}{(x_1+y_1)^2}, \quad (11)$$

where the value of $R_{area}$ is always less than one, the closer to one $R_{area}$ is, the more similar $x_1$ and $y_1$ are.

It is appreciated that besides rectangular (including square) shapes, the first and second platforms $106_1$, $106_2$ can have a variety of shapes that satisfy the design rule of equal perimeters and different areas. Non-limiting examples of other possible platform shapes include polygonal, circular, and elliptical shapes. Referring to FIGS. 11A to 11E, there are depicted five possible examples of unmatched pairs of platform shapes having the same perimeters but different surface areas. It is appreciated that in the case of a platform having one or more holes therein, such as the platform $106_2$ in FIG. 11E, the perimeter to be considered in the design rule is the sum of the outer perimeter of the platform and the perimeter of the hole or of each hole.

Figure 12:
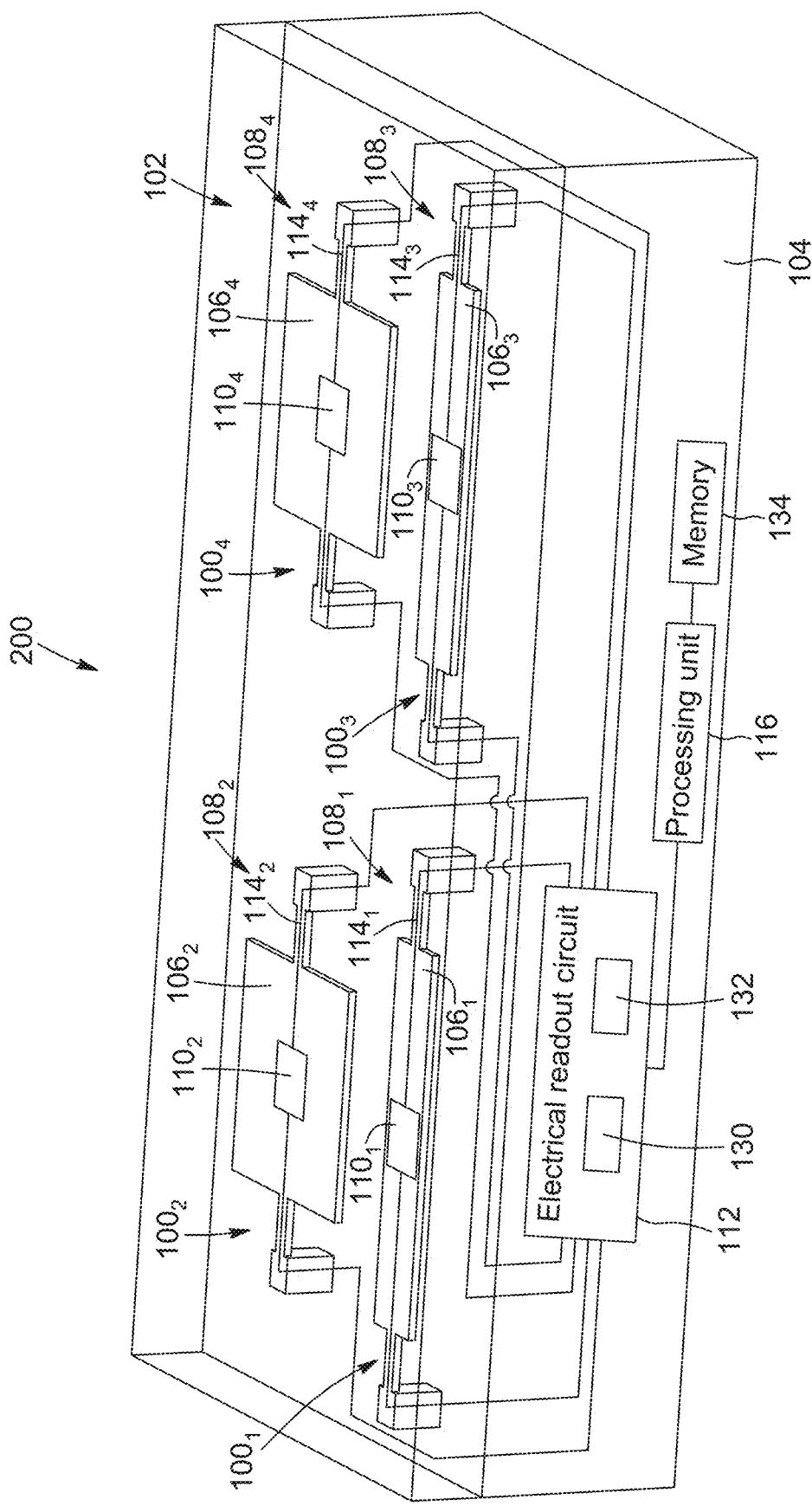
FIG. 12 is a schematic representation of another possible embodiment of a heat-loss pressure microsensor.

Referring to FIG. 12, there is illustrated another embodiment of a heat-loss pressure microsensor 200 for measuring a gas pressure in an environment 102. The heat-loss pressure microsensor 200 generally includes a substrate 104 and four pressure gauges $100_1$, $100_2$, $100_3$, $100_4$ exposed to the environment 102.

The substrate 104 is a component of the pressure microsensor 200 that provides mechanical support to the four pressure gauges $100_1$-$100_4$. The structure and composition of the substrate 104 may be similar to those described above with respect to FIGS. 1 and 6. As mentioned above with respect to FIG. 6, the substrate 104 in FIG. 12 may be one of a plurality of dies separated from a semiconductor wafer, where each one of the separated dies may be used to form an individual four-gauge pressure microsensor 200, such as the one depicted in FIG. 12. Such a four-gauge pressure microsensor 200 may be incorporated in vacuum-packaged MEMS and MOEMS devices, in analytical and processing equipment with integrated vacuum systems, or in any other suitable applications.

The four pressure gauges $100_1$-$100_4$ are arranged proximate to each other on the substrate 104. As noted above, the term "proximate" is used herein to indicate that the distance separating any pair of gauges among the four pressure gauges $100_1$-$100_4$ is small compared to the scale of spatial nonuniformities in the fabrication tolerances, such that the fabrication-related dimensional variations affecting the four pressure gauges $100_1$-$100_4$ in the embodiment of FIG. 12 can be assumed to be substantially the same within tolerances that are acceptable for the proper operation of this embodiment. For example, the four pressure gauges $100_1$-$100_4$ may be arranged on the substrate 104 in two rows and two columns (2×2 array) and may be separated from one another by center-to-center inter-gauge distances ranging from about 40 µm to about 500 µm. However, various other arrangements of the four pressure gauges $100_1$-$100_4$ on the substrate 104 are possible. Non-limiting examples include a 1×4 array, a 4×1 array, and any other suitable regular or irregular configurations.

In FIG. 12, each of the four pressure gauges $100_1$-$100_4$ can include a thermistor $110_1$-$110_4$ having an electrical resistance $R_1$-$R_4$ that varies with changes in its temperature $T_1$-$T_4$, which temperature changes can result from variations in gas pressure p in the environment 102; a platform $106_1$-$106_4$ configured to receive the thermistor $110_1$-$110_4$ in a spaced-apart relationship from the substrate 104; and a support structure $108_1$-$108_4$ configured to hold the platform $106_1$-$106_4$ above the substrate 104. Each of the four pressure gauges $100_1$-$100_4$ is also configured to produce a respective gauge output signal, which may be an electrical signal (e.g., a voltage or current) related to or indicative of the electrical resistance $R_1$-$R_4$ of its thermistor $110_1$-$110_4$. The four gauge output signals all convey information about the gas pressure in the environment 102. It is appreciated that the structure, composition, and operation of the platforms $106_1$-$106_4$, the support structures $108_1$-$108_4$, and the thermistors $110_1$-$110_4$ of the four pressure gauges $100_1$, $100_4$ in FIG. 12 may be similar to those described above.

Based on the assumption that the four pressure gauges $100_1$-$100_4$ are sufficiently close to one another to suffer from substantially the same fabrication-related dimensional variations, the four pressure gauges $100_1$-$100_4$ are configured to obey certain geometrical design rules to reduce the sensitivity of the four-gauge pressure microsensor 200 to fabrication tolerances. The first design rule is that the first pressure gauge $100_1$ and the third pressure gauge $100_3$ be nominally identical to each other. The second design rule is that the second pressure gauge $100_2$ and the fourth pressure gauge $100_4$ be nominally identical to each other. The third design rule is to provide the support structures $108_1$, $108_3$ of the first and third pressure gauges $100_1$, $100_3$ with the same nominal geometry as the support structures $108_2$, $108_4$ of the second and fourth pressure gauges $100_2$, $100_4$. The fourth design rule is to provide the platforms $106_1$, $106_3$ of the first and third pressure gauges $100_1$, $100_3$ with the same nominal perimeters but different nominal surface areas than the platforms $106_2$, $106_4$ of the second and fourth pressure gauges $100_2$, $100_4$.

It is appreciated that by providing the first and third pressure gauges $100_1$, $100_3$ with a first geometry and the second and fourth pressure gauges $100_2$-$100_4$ with a second geometry, which is different from the first geometry, the four-gauge pressure microsensor 200 may be configured to produce a differential signal from a first combined output signal and a second combined output signal, where the first combined output signal is obtained from a combination of the first and third gauge output signals, and the second combined output signal is obtained from a combination of the second and fourth gauge output signals.

Furthermore, the four-gauge pressure microsensor 200 of FIG. 12 is configured to implement a dual-temperature pressure measurement technique such as described above.

Figure 13:
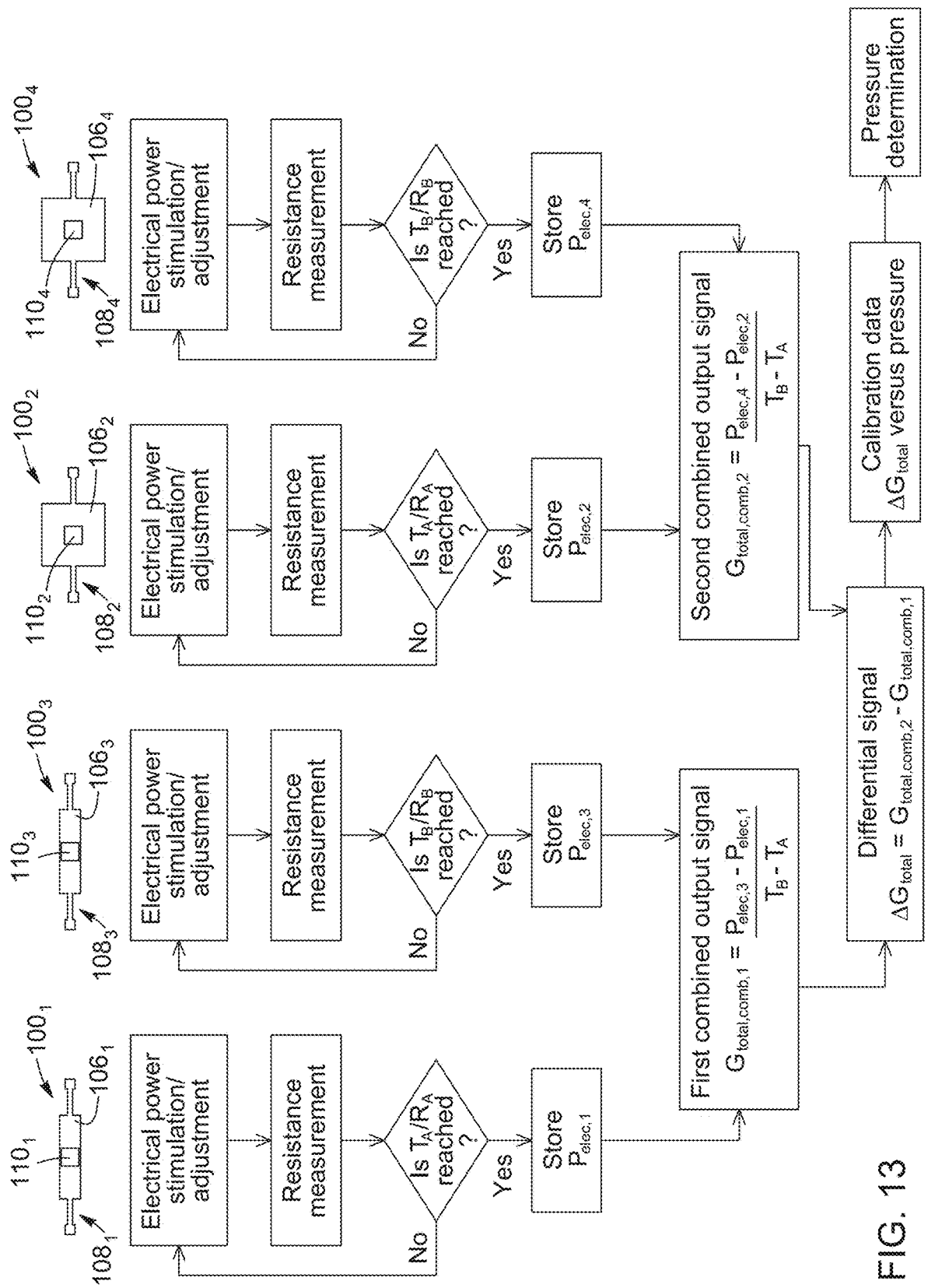
FIG. 13 is a flow diagram of another method for measuring gas pressure, in accordance with a possible embodiment.

The four pressure gauges $100_1$-$100_4$ may be configured to operate as follows, with reference to FIG. 13. The first and the second pressure gauges $100_1$, $100_2$ may be configured for operation at a first temperature $T_{A,1}$ and $T_{A,2}$, while the third and fourth pressure gauges $100_3$, $100_4$ may be configured for operation at a second temperature $T_{B,3}$ and $T_{B,4}$, different from $T_{A,1}$ and $T_{A,2}$, respectively. It is assumed hereinbelow that $T_{A,1}=T_{A,2}=T_A$ and $T_{B,3}=T_{B,4}=T_B \neq T_A$, although other embodiments may have $T_{A,1}$ different from $T_{A,2}$ and/or $T_{B,3}$ different from $T_{B,4}$. The first gauge output signal may be representative of the amount of applied electrical power $P_{elec,1}$ needed to bring the temperature $T_1$ of the first thermistor $110_1$ to $T_A$, while the second gauge output signal may be representative of the amount of applied electrical power $P_{elec,2}$ needed to bring the temperature $T_2$ of the second thermistor $110_2$ to $T_A$. Furthermore, the third gauge output signal may be representative of the amount of applied electrical power $P_{elec,3}$ needed to bring the temperature $T_3$ of the third thermistor $110_3$ to $T_B$, while the fourth gauge output signal may be representative of the amount of applied electrical power $P_{elec,4}$ needed to bring the temperature $T_4$ of the further second thermistor $110_4$ to $T_B$. As noted above with respect to FIG. 8, the determination of each one of the electrical power amounts $P_{elec,1}$ to $P_{elec,4}$ may include iterative steps of electrical power stimulation/adjustment and electrical resistance measurement until the target thermistor temperature $T_A$ or $T_B$ is reached. It is appreciated that the pressure microsensor 200 of FIG. 12 may include an electrical readout circuit 112 to perform the electrical measurements needed to determine $P_{elec,1}$ to $P_{elec,4}$. The electrical readout circuit 112 used in FIG. 12 may be similar to those described above.

Once the amounts of electrical power $P_{elec,1}$ to $P_{elec,4}$ have been determined, they may be used to provide the first and the second combined output signals. In one embodiment, the first and second combined output signals may correspond to thermal conductances $G_{total,comb,1}(p)$ and $G_{total,comb,2}(p)$ and may be obtained from Eq. (4) as follows:

$$G_{total,comb,1}(p) = \frac{P_{elec,3} - P_{elec,1}}{T_B - T_A}, \quad (12)$$

$$G_{total,comb,2}(p) = \frac{P_{elec,4} - P_{elec,2}}{T_B - T_A}. \quad (13)$$

Once the first and second combined output signals $G_{total,comb,1}$ and $G_{total,comb,2}$ have been determined, they may be used to determine a differential signal $\Delta G_{total}(p)$ of the four-gauge pressure microsensor 200, as follows:

$$\Delta G_{total}(p) = G_{total,comb2}(p) - G_{total,comb1}(p). \quad (14)$$

The differential signal $\Delta G_{total}(p)$ may then be used to determine the gas pressure p in the environment 102, for example by referring to a calibration curve or a lookup table relating $\Delta G_{total}(p)$ to gas pressure p, over a certain pressure range.

The pressure microsensor 200 of FIG. 12 may include or be connected to a processing unit 116, which may be configured to perform, inter alia, one or more of the following steps: receiving the four gauge output signals from the electrical readout circuit 112; obtaining the first combined output signal from the first and third gauge output signals and the second combined output signal from the second and fourth gauge output signals; obtaining the differential signal from the first and second combined output signals; and determining the pressure from the differential signal, for example by retrieving a calibration response function stored in memory 134 connected to the processing unit 116. The processing unit 116 used in FIG. 12 may be similar to those described above.

It is appreciated that since that the first and third pressure gauges $100_1$, $100_3$ are nominally identical, and likewise for the second and fourth pressure gauges $100_2$, $100_4$, Eq. (14) may be reduced to Eq. (10), in which $x_1y_1$ corresponds to the surface area of both the first and third platforms $106_1$, $106_3$ and $x_2y_2$ corresponds to the surface area of both the second and fourth platforms $106_2$, $106_4$.

It is also appreciated that by implementing a dual-temperature pressure measurement technique with a pressure microsensor 200 having a four-gauge configuration rather than a dual-gauge configuration, the electrical measurements associated with the first temperature $T_A$ and the electrical measurements associated with the second temperature $T_B$ may be performed at the same time rather than one after the other. In addition to reducing the measurement time, using a four-gauge configuration may help ensuring that the electrical measurements associated with the first temperature $T_A$ and the electrical measurements associated with the second temperature $T_B$ are carried out under substantially the same radiative environment.

It is noted that while the embodiments described above referred to dual-gauge and four-gauge pressure microsensors, multi-gauge pressure microsensors including three or more than four pressure gauges may also be contemplated to implement the present techniques.

In accordance with another aspect of the present techniques, there is disclosed a method for measuring a gas pressure in an environment. The method may be implemented using a heat-loss pressure microsensor such as those described above, or another suitable multi-gauge pressure sensor.

The method may include a step of providing a first pressure gauge and a second pressure gauge in a proximate relationship on a substrate. For example, this step may involve arranging the first pressure gauge and the second pressure gauge spaced apart from each other by a center-to-center inter-gauge distance ranging from about 40 µm to about 500 µm. The first and second pressure gauges may each include a thermistor having an electrical resistance that varies in accordance with the gas pressure in the environment, a platform configured to receive the thermistor, and a support structure configured to hold the platform above the substrate. The two platforms may be configured to have equal nominal perimeters but different nominal surface areas, while the two support structures may be configured to have a same nominal geometry. By way of example, in one embodiment the platform of one of the first and second pressure gauges has a square shape, while the platform of the other one of the first and second pressure gauges has a rectangular shape. As noted above, the application of such design rules may allow the gas pressure to be determined with reduced sensitivity to fabrication-related dimensional variations.

The method may also include a step of measuring a first gauge output signal and a second gauge output signal, which are indicative of the electrical resistance of the thermistor of the first and second pressure gauges, respectively. In one embodiment, the step of measuring the first gauge output signal may include relating the first gauge output signal to an amount of electrical power for varying the electrical resistance of its thermistor between two resistance values corresponding to a change in its thermistor's temperature between two temperature values. Likewise, the step of measuring the second gauge output signal may include relating the second gauge output signal to an amount of electrical power for varying the electrical resistance of its thermistor between two resistance values corresponding to a change in its thermistor's temperature between the two temperature values.

The method may also include a step of obtaining a differential signal from the first and second gauge output signals, and a step of determining the gas pressure in the environment from the differential signal.

In one embodiment, the method may further include a step of providing a third pressure gauge and a fourth pressure gauge on the substrate in a proximate relationship with each other and with the first and second pressure gauges. Each one of the third and fourth pressure gauges may include a thermistor having an electrical resistance that varies in accordance with the gas pressure in the environment, a platform configured to receive the thermistor, and a support structure configured to hold the platform above the substrate. The third and fourth pressure gauge may be configured to be substantially identical to the first and second pressure gauges, respectively. The method may further include a step of measuring a third gauge output signal and a fourth gauge output signal indicative of the electrical resistance of the thermistor of the third and fourth pressure gauges, respectively. In this embodiment, the first and second gauge output signals may be associated with a first thermistor temperature, while the third and fourth gauge output signals may be associated with a second thermistor temperature, different from the first thermistor temperature. Furthermore, the step of obtaining the differential signal may include obtaining a first combined output signal from the first and third gauge output signals, obtaining a second combined output signal from the second and fourth gauge output signals, where the first and second combined output signals are related to a difference between the first and second thermistor temperatures, and determining the differential signal from the first and second combined output signals.

Of course, numerous modifications could be made to the embodiments described above without departing from the scope of the appended claims.

The invention claimed is:

1. A heat-loss pressure microsensor for measuring a gas pressure in an environment, comprising:
   a substrate;
   a first pressure gauge arranged on the substrate, the first pressure gauge comprising: a first thermistor having an electrical resistance that varies in accordance with a temperature of the first thermistor, the temperature of the first thermistor being responsive to the gas pressure in the environment; a first platform configured to receive the first thermistor; and a first support structure configured to hold the first platform above the substrate, wherein the first pressure gauge is configured to produce a first gauge output signal related to the electrical resistance of the first thermistor; and
   a second pressure gauge arranged on the substrate proximate to the first pressure gauge, the second pressure gauge comprising: a second thermistor having an electrical resistance that varies in accordance with a temperature of the second thermistor, the temperature of the second thermistor being responsive to the gas pressure in the environment; a second platform configured to receive the second thermistor; and a second support structure configured to hold the second platform above the substrate, wherein the second pressure gauge is configured to produce a second gauge output signal related to the electrical resistance of the second thermistor,
   wherein the first platform and the second platform are configured to have equal nominal perimeters and different nominal surface areas,
   wherein the first support structure and second support structure are configured to have a same nominal geometry, and wherein a differential signal obtained from the first and second gauge output signals conveys information about the gas pressure in the environment.

2. The heat-loss pressure microsensor of claim 1, wherein the first and second pressure gauges are spaced apart from each other by a center-to-center inter-gauge distance ranging from about 40 µm to about 500 µm.

3. The heat-loss pressure microsensor of claim 1, wherein the first and second platforms each have a square shape, a rectangular shape, a polygonal shape, a circular shape, or an elliptical shape.

4. The heat-loss pressure microsensor of claim 1, wherein one of the first and second platforms has a square shape and the other one of the first and second platforms has a rectangular shape.

5. The heat-loss pressure microsensor of claim 1, wherein the first and second support structures each comprise a plurality of support arms connected to the first platform and the second platform, respectively.

6. The heat-loss pressure microsensor of claim 1, wherein the first and second thermistors are each made of a vanadium oxide material, an amorphous silicon material, or a titanium oxide material.

7. The heat-loss pressure microsensor of claim 1, wherein the first gauge output signal is representative of a first amount of electrical power for varying the electrical resistance of the first thermistor between two resistance values corresponding to a change in the temperature of the first thermistor between a first pair of temperature values, and wherein the second gauge output signal is representative of a second amount of electrical power needed for varying the electrical resistance of the second thermistor between two resistance values corresponding to a change in the temperature of the second thermistor between a second pair of temperature values.

8. The heat-loss pressure microsensor of claim 7, wherein the temperature values of the first pair are substantially the same as the temperature values of the second pair.

9. The heat-loss pressure microsensor of claim 1, further comprising:
an electrical readout circuit electrically connected to the first thermistor and the second thermistor and configured to measure the first gauge output signal and the second gauge output signal; and
a processing unit operatively connected to the electrical readout circuit and configured to receive the first gauge output signal and the second gauge output signal measured by the electrical readout unit, obtain the differential signal from the first and second gauge output signals, and determine the gas pressure in the environment from the differential signal.

10. The heat-loss pressure microsensor of claim 9, wherein the processing unit is configured to determine the differential signal by calculating a difference between a first thermal conductance, associated with the first pressure gauge and derived from the first gauge output signal, and a second thermal conductance, associated with the second pressure gauge and derived from the second gauge output signal.

11. The heat-loss pressure microsensor of claim 10, wherein the processing unit is configured to determine the gas pressure in the environment from the differential signal by comparing the differential signal with calibration data relating a differential thermal conductance parameter of the heat-loss pressure microsensor to gas pressure.

12. The heat-loss pressure microsensor of claim 1, further comprising:
a third pressure gauge arranged on the substrate proximate to the first pressure gauge and the second pressure gauge, the third pressure gauge comprising: a third thermistor having an electrical resistance that varies in accordance with a temperature of the third thermistor, the temperature of the third thermistor being responsive to the gas pressure in the environment; a third platform configured to receive the third thermistor; and a third support structure configured to hold the third platform above the substrate, wherein the third pressure gauge is configured to produce a third gauge output signal related to the electrical resistance of the third thermistor, and wherein the third pressure gauge being configured to be substantially identical to the first pressure gauge; and
a fourth pressure gauge arranged on the substrate proximate to the first pressure gauge, the second pressure gauge, and the third pressure gauge, the fourth pressure gauge comprising: a fourth thermistor having an electrical resistance that varies in accordance with a temperature of the fourth thermistor, the temperature of the fourth thermistor being responsive to the gas pressure in the environment; a fourth platform configured to receive the fourth thermistor; and a fourth support structure configured to hold the fourth platform above the substrate, wherein the fourth pressure gauge is configured to produce a fourth gauge output signal related to the electrical resistance of the fourth thermistor, and wherein the fourth pressure gauge being configured to be substantially identical to the second pressure gauge, and
wherein the first, second, third, and fourth gauge output signals are associated with respective first, second, third, and fourth temperature values of the first, second, third, and fourth thermistors, the first and third temperature values being different from each other, and the second and fourth temperature values being different from each other, and
wherein the differential signal is obtained from a first combined output signal obtained from the first and third gauge output signals and from a second combined output signal obtained from the second and fourth gauge output signals.

13. The heat-loss pressure microsensor of claim 12, wherein the first and second temperature values are substantially the same and the third and fourth temperature values are substantially the same.

14. The heat-loss pressure microsensor of claim 12, wherein the third and fourth pressure gauges are spaced apart from each other and from the first and second pressure gauges by inter-gauge distances ranging from 40 µm to 500 µm.

15. The heat-loss pressure microsensor of claim 12, further comprising:
an electrical readout circuit electrically connected to the first, second, third, and fourth thermistors, the electrical readout circuit being configured to measure the first, second, third, and fourth gauge output signals; and
a processing unit operatively connected to the electrical readout circuit and configured to receive the first, second, third, and fourth gauge output signals measured by the electrical readout unit, obtain the differential signal from the first, second, third, and fourth gauge output signals, and determine the gas pressure in the environment from the differential signal.

16. A method for measuring a gas pressure in an environment, comprising:
- providing a first pressure gauge and a second pressure gauge in a proximate relationship on a substrate, each one of the first and second pressure gauges comprising a thermistor having an electrical resistance that varies in accordance with a temperature of the thermistor, the temperature of the thermistor being responsive to the gas pressure in the environment, a platform configured to receive the thermistor, and a support structure configured to hold the platform above the substrate, wherein the two platforms are configured to have equal nominal perimeters and different nominal surface areas, and the two support structures are configured to have a same nominal geometry;
- measuring a first gauge output signal and a second gauge output signal indicative of the electrical resistance of the thermistor of the first and second pressure gauges, respectively;
- obtaining a differential signal from the measured first and second gauge output signals; and
- determining the gas pressure in the environment from the differential signal.

17. The method of claim 16, wherein obtaining the differential signal comprises:
- deriving, from the first gauge output signal, a first thermal conductance associated with the first pressure gauge;
- deriving, from the second gauge output signal, a second thermal conductance associated with the second pressure gauge; and
- calculating the differential signal as a difference between the first thermal conductance and the second thermal conductance.

18. The method of claim 16, wherein providing the first pressure gauge and the second pressure gauge comprises arranging the first pressure gauge and the second pressure gauge spaced apart from each other by a center-to-center inter-gauge distance ranging from about 40 μm to about 500 μm.

19. The method of claim 16, wherein measuring the first gauge output signal comprises relating the first gauge output signal to an amount of electrical power for varying the electrical resistance of the thermistor of the first pressure gauge between two resistance values corresponding to a change in the temperature of the thermistor of the first pressure gauge between a first pair of temperature values, and wherein measuring the second gauge output signal comprises relating the second gauge output signal to an amount of electrical power for varying the electrical resistance of the thermistor of the second pressure gauge between two resistance values corresponding to a change in the temperature of the thermistor of the second pressure gauge between a second pair of temperature values.

20. The method of claim 16, further comprising:
- providing a third pressure gauge and a fourth pressure gauge on the substrate in a proximate relationship with each other and with the first and second pressure gauges, each one of the third and fourth pressure gauges comprising a thermistor having an electrical resistance that varies in accordance with a temperature of the thermistor, the temperature of the thermistor being responsive to the gas pressure in the environment, a platform configured to receive the thermistor, and a support structure configured to hold the platform above the substrate, wherein the third and fourth pressure gauges are configured to be substantially identical to the first and second pressure gauges, respectively; and measuring a third gauge output signal and a fourth gauge output signal indicative of the electrical resistance of the thermistor of the third and fourth pressure gauges, respectively, wherein the first, second, third, and fourth gauge output signals are associated with respective first, second, third, and fourth temperature values of the first, second, third, and fourth thermistors, the first and third temperature values being different from each other, and the second and fourth temperature values being different from each other, and wherein obtaining the differential signal comprises obtaining a first combined output signal from the measured first and third gauge output signals, obtaining a second combined output signal from the measured second and fourth gauge output signals, and determining the differential signal from the first and second combined output signals.

* * * * *